United States Patent
Boss et al.

(10) Patent No.: US 9,637,002 B1
(45) Date of Patent: *May 2, 2017

(54) ADAPTIVE, AUTOMATICALLY-RECONFIGURABLE, VEHICLE INSTRUMENT DISPLAY

(71) Applicant: INTERNATIONAL BUSINESS MACHINES CORPORATION, Armonk, NY (US)

(72) Inventors: Gregory J. Boss, Saginaw, MI (US); Rick A. Hamilton, II, Charlottesville, VA (US); Luis Carlos Cruz Huertas, San Jose (CR); Edgar Adolfo Zamora Duran, Santo Domingo (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/169,909

(22) Filed: Jun. 1, 2016

Related U.S. Application Data

(63) Continuation of application No. 14/944,031, filed on Nov. 17, 2015, now Pat. No. 9,457,665, and a
(Continued)

(51) Int. Cl.
    *G06F 7/00* (2006.01)
    *B60K 35/00* (2006.01)
    *H04N 5/225* (2006.01)
    *G06K 9/00* (2006.01)
    *G06F 3/01* (2006.01)

(52) U.S. Cl.
    CPC .............. *B60K 35/00* (2013.01); *G06F 3/013* (2013.01); *G06K 9/00228* (2013.01); *H04N 5/225* (2013.01); *B60K 2350/352* (2013.01)

(58) Field of Classification Search
    CPC ............ B60K 35/00; B60K 2350/1072; B60K 2350/352; H04N 5/225; B60R 25/01; G01C 21/34
    USPC ....... 701/29, 36, 2; 715/771; 340/10.42, 461; 345/173
See application file for complete search history.

(56) References Cited

U.S. PATENT DOCUMENTS 5,360,971 A * 11/1994 Kaufman ............... A61B 3/113
    250/221
6,812,942 B2   11/2004 Ribak
(Continued)

FOREIGN PATENT DOCUMENTS

WO     2013074899     5/2013

OTHER PUBLICATIONS

Siewiorek et al., "Multimodal Contextual Car-Driver Interface" Proceedings of the 4th IEEE International Conference on Multimodal Interfaces (ICMI'02), pp. 367-373 (2002).
(Continued)

*Primary Examiner* — Shardul Patel
(74) *Attorney, Agent, or Firm* — Weitzman Law Offices, LLC

(57) ABSTRACT

An adaptive, automatically-reconfigurable, vehicle instrument display method and system are described that use information from multiple sensors located within the vehicle that monitor various aspects of a vehicle's operation and health to automatically modify presence and/or location of widgets in the vehicle's instrument display panel based upon circumstances or conditions as they occur or change.

10 Claims, 17 Drawing Sheets

Related U.S. Application Data continuation of application No. 14/944,061, filed on Nov. 17, 2015, now Pat. No. 9,452,678, and a continuation of application No. 14/944,080, filed on Nov. 17, 2015, now Pat. No. 9,469,195.

(56) References Cited

U.S. PATENT DOCUMENTS

| | | | |
|---|---|---|---|
| 8,185,845 B2 | 5/2012 | Bjorklund et al. | |
| 8,344,870 B2 | 1/2013 | Evans et al. | |
| 8,542,108 B1 | 9/2013 | Izdepski et al. | |
| 8,818,624 B2* | 8/2014 | Small | B60K 35/00 701/36 |
| 2007/0194902 A1* | 8/2007 | Blanco | G01C 21/365 340/461 |
| 2008/0211779 A1* | 9/2008 | Pryor | G01C 21/3664 345/173 |
| 2009/0218160 A1 | 9/2009 | Baluch et al. | |
| 2010/0127847 A1* | 5/2010 | Evans | G06F 3/04817 340/461 |
| 2010/0231504 A1* | 9/2010 | Bloem | G06F 3/013 345/156 |
| 2010/0268426 A1* | 10/2010 | Pathak | G06F 3/03547 701/48 |
| 2011/0175754 A1* | 7/2011 | Karpinsky | B60K 35/00 340/963 |
| 2011/0208384 A1* | 8/2011 | Tarte | B60K 35/00 701/31.4 |
| 2012/0173067 A1* | 7/2012 | Szczerba | G02B 27/01 701/23 |
| 2013/0134730 A1* | 5/2013 | Ricci | G06F 9/54 296/24.34 |
| 2013/0144520 A1 | 6/2013 | Ricci | |
| 2013/0207794 A1 | 8/2013 | Patel et al. | |
| 2013/0293452 A1* | 11/2013 | Ricci | G02B 27/01 345/156 |
| 2013/0335449 A1* | 12/2013 | Johnson | G06T 13/40 345/634 |
| 2014/0139341 A1 | 5/2014 | Green et al. | |
| 2016/0001781 A1 | 1/2016 | Fung et al. | |

OTHER PUBLICATIONS

Kapoor et al., "Fully Automatic Upper Facial Action Recognition" IEEE International Workshop on Analysis and Modeling of Faces and Gestures (Oct. 2003).

Abstract of Bellotti et al., "Designing configurable automotive dashboards on liquid crystal displays," Cognition, Technology & Work vol. 6, No. 4, pp. 247-265 (2004).

Nguyen et al., "Tracking Facial Features under Occlusions and Recognizing Facial Expressions in Sign Language," Proceedings of the Conference on Face & Gesture Recognition FG2008 pp. 1-7 (2008).

Moore et al., "Multi-View Pose and Facial Expression Recognition," Proceedings of the British Machine Vision Conference (2010).

Vaish, "Feedback Must Feedforward" (published at http://finalmile.in/behaviourarchitecture/feedback-must-feedforward) Dec. 29, 2011.

Castronovo et al., "What, Where, and When? Intelligent Presentation Management for Automotive Human Machine Interfaces and Its Application," Proceedings of the 15th Internationa Conference on Human Interface and the Management of Information: Information and Interaction for Health, Safety, Mobility and Complex Environments—vol. Part II, pp. 460-469 (2013).

Heigemeyr et al., "Information Management for Adaptive Automotive Human Machine Interfaces," AutomotiveUI'14, Proceedings of the 6th International Conference on Automotive User Interfaces and Interactive Vehicular Applications, pp. 1-8 (2014).

\* cited by examiner

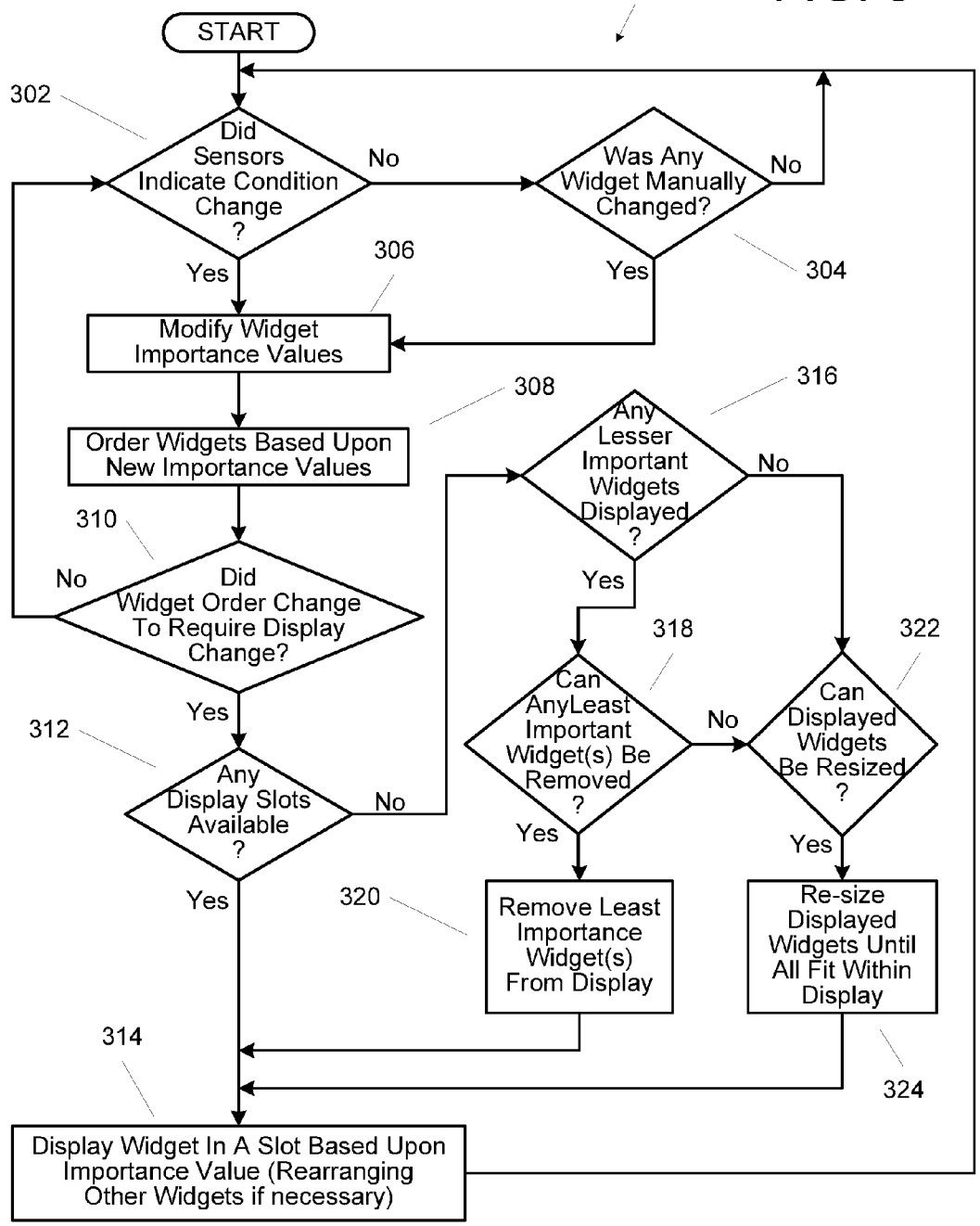

ADAPTIVE, AUTOMATICALLY-RECONFIGURABLE, VEHICLE INSTRUMENT DISPLAY

CROSS REFERENCE TO RELATED APPLICATIONS

This application is a continuation of U.S. patent application Ser. No. 14/944,031, filed Nov. 17, 2015, and is related to both U.S. patent application Ser. No. 14/944,061 and U.S. patent application Ser. No. 14/944,080, both filed on Nov. 17, 2015, and all of the foregoing applications are incorporated herein by reference in their entirety.

FIELD OF THE INVENTION

This invention relates to motor vehicles and, more particularly, to instrument panels for motor vehicles.

BACKGROUND

The instrument panel is an important part of a motor vehicle because it continuously conveys information to the driver about aspects of the vehicle's operation.

Originally, vehicle instruments (e.g., gauges, dials and warning lights) were purely mechanical and/or analog and fixed in place.

More commonly now, instrument panels are implemented as a form of digital computer screen containing software-implemented graphic manifestations (called "widgets") of vehicle-related instruments (e.g., speedometer, tachometer, fuel level, etc.) and warnings (e.g., "check engine," door(s) ajar, low tire pressure, etc.). With this switchover from fixed displays, some vehicle manufacturers now allow drivers to customize the look and layout of their display to some extent, even allowing different drivers of the same vehicle to have display content and layout according to their own preference. This convenience feature is similar to allowing a vehicle to "remember" particular seat, mirror(s) and steering wheel positions for two different drivers, and to recall those saved positions with the touch of a button so that, with some current instrument panels, users can likewise set their preferences so that, for example, one driver can set a preference for the speedometer to be in the center of the panel and not show a tachometer, whereas another user of the same vehicle can have the tachometer displayed in the center and the speedometer off to one side. While this is a convenient advantage, it also inherently creates a problem. Specifically, because users can specify exactly what gauges or information they will normally see, and where they are located, the chosen configuration may, in some cases, prevent them from having information they actually should have. While critical failure information (such as system failures that were commonly previously indicated with warning lights), e.g., "check engine," low fuel or tire pressure, or a braking system failure, will be displayed irrespective of user setting, that is not true for non-critical, non-failure information that they nevertheless should seen by the driver under certain circumstances.

Such displays can also more easily be obscured by bright light, such as sunlight, impinging on them. Additionally, if the manufacturer allows a driver to change the display content, there is an elaborate process that must be undertaken to do so each time a change is desired, so making temporary changes is annoying and time consuming and even hazardous if such a change is (or can be) attempted while driving.

Thus, the foregoing represents a case where a technological advance on the one hand inherently creates a problem on the other.

SUMMARY

An adaptive, automatically-reconfigurable, vehicle instrument display method and system are described that use information from multiple sensors located within the vehicle that monitor various aspects of a vehicle's operation and health to automatically modify presence and/or location of widgets in the vehicle's instrument display panel based upon circumstances or conditions as they occur or change.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIG. 3 illustrates, in simplified form, a flowchart of one example process for implementing the automatic pro-active modification of the instrument panel display based upon changed circumstances;

DETAILED DESCRIPTION

This disclosure provides technical solutions to address the aforementioned problems. Specifically, through the use of various sensors, instrument panels configured according to one of the approaches herein will dynamically reconfigure and adapt to user actions and/or other circumstances.

In simplified general overview, our approach addresses the foregoing problems with a technical solution that uses input from various sensors relating to various combinations of external, internal and/or vehicle factors to identify components of a vehicle display that have importance under the then-current circumstances and/or conditions and automatically modify the display so that the relevant information is provided to the user so they can monitor the circumstances and/or conditions before a failure occurs or so that a situation that could lead to a failure can be avoided.

Figure 1:
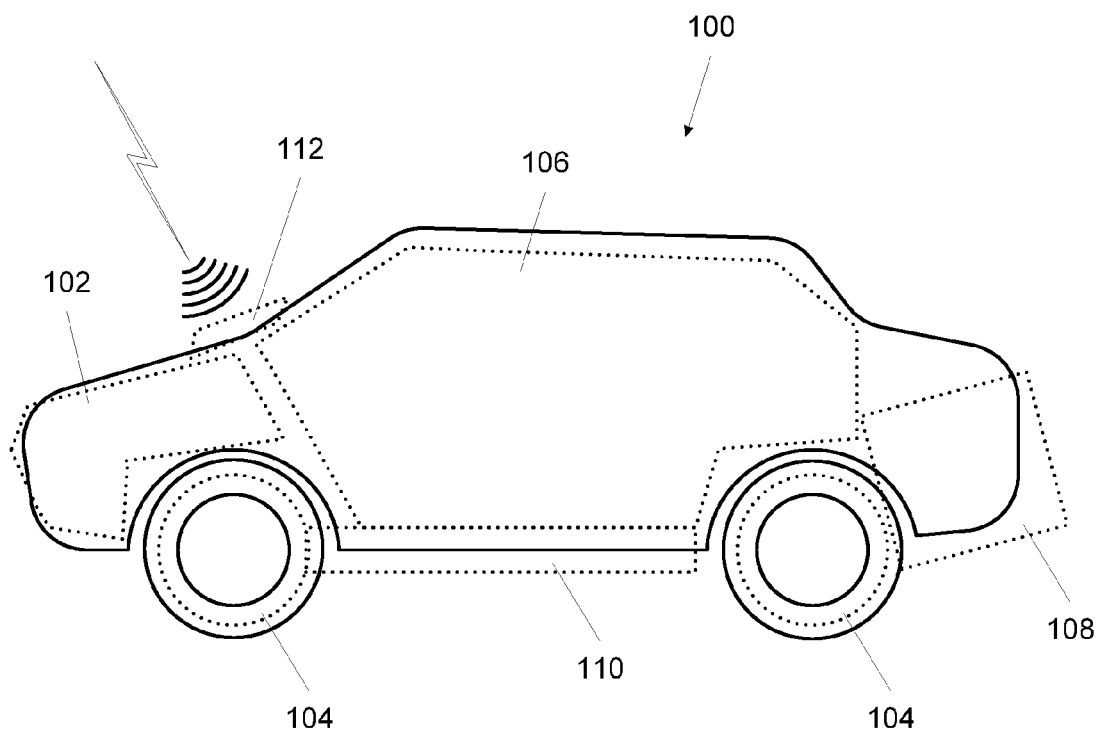
FIG. 1 is a simplified representation of a vehicle 100 having multiple monitor-able zones.

FIG. 1 is a simplified representation of a vehicle 100 having multiple monitor-able zones. Virtually all newer vehicles, particularly cars, are equipped with numerous sensors, located in different zones 102, 104, 106, 108, 110, 112 of the vehicle 100, that are involved in monitoring various aspects of a vehicle's operation and health.

Such sensors may include, for example, well known prior art sensors:

A) in the front-most zone 102 of FIG. 1, related to the operation of the engine, cooling system, lubrication system, the headlights, for vibration detection, and parts of the pollution control and steering systems;

B) in the wheel zone 104 of FIG. 1, related to the tire inflation pressure, brake system, wheel speed, wheel alignment and possibly the suspension system;

C) in the passenger compartment/chassis zone 106 of FIG. 1, related to interior temperature, interior lighting, sound level, steering, doors and windows state, vehicle attitude (i.e., roll, pitch, yaw, heave, sway and surge), noise, vibration and seat occupancy;

D) in the rear zone 108 of FIG. 1, related to fuel level, exhaust and rear lights (e.g., brake, reverse and tail lights); and E) in the exterior central zone 110 of FIG. 1, related to the transmission and exhaust system.

In addition, some vehicles 100 may include sensors 112, to detect vehicle-external circumstances such as, exterior temperature and precipitation, and/or that act as receivers to receive traffic information, weather reports and/or location information (e.g., GPS, SatNav, etc.).

Although such sensors may be located in different zones for different vehicles, they may generally include, for example, well known tachometers for engine speed, sensors for coolant level and temperature, oil temperature and level, throttle position sensors, ammeter(s)/voltmeters (i.e., for the battery and charging system health), vehicle speed, tire inflation, wheel slip sensors, steering angle and/or torque, suspension travel, fuel tank contents level, traction control, thermometer(s), microphone(s) to detect noise, 3- or 6-axis ("multi-axis") sensors to detect vehicle orientation changes, accelerometer(s), oxygen and/or other gas sensors to measure engine exhaust and intake air, etc.

When a fault in some part of the vehicle is detected by one or more of the foregoing sensors, the engine control unit or other processor(s) in the vehicle will cause that fault to be indicated in some manner in the dashboard instrument panel display, typically according to ISO standard ISO 2575:2010 entitled "Road vehicles—Symbols for controls, indicators and tell-tales." However, display of those indicators and/or tell-tales results purely from a failure or, with the exception of a low fuel warning, some other non-predictive condition that then-exists. Those sensors are not used, individually, let alone collectively, to predict or anticipate a situation that could result in a failure in the near future if persistent or should be indicated to the driver as noteworthy. Still further, when indicators are provided, they are generally displayed in a fixed location. Even in the newest vehicles, where vehicle users have the ability to modify where certain particular visual elements are located in the graphical display (e.g., the speedometer and/or tachometer), placement of the warnings or tell-tales and other display elements are typically fixed in a location specified by the vehicle manufacturer irrespective of the vehicle user's changed layout.

While the foregoing may be fine for indicating actual failure conditions, such an approach is unsuitable if the intent is to predict or anticipate a situation because, as circumstances change, the various display elements may become more or less relevant even though a failure condition never arises. For a predictive or anticipatory system capable of making decisions based upon combinations of sensor readings, a dynamic, self re-configuring instrument panel, is needed. Such a system is described herein an uses input from a combination of sensors to recognize in-car and environmental problems and it will modify the display of widgets representing the displayed elements (e.g. speedometer, oil temperature/pressure, engine temperature, fuel gauge, etc.) to inform the driver as the situation warrants, dynamically and automatically in real time. Moreover, some variants of the system can use externally provided information, for example, weather, traffic or GPS/SatNav information, in conjunction with the sensor data to modify the display. Depending upon the particular implementation and vehicle, different combination(s) of sensor information may indicate different potential situations. Thus, the system will be constructed with at least one processor and associated programming that will receive information obtained via the sensors, analyze it, and determine if it is indicative of a change in circumstances and/or conditions for that vehicle. Since the number of permutations and combinations of potential readings can be quite large, and different sets of sensors can be used to identify the same circumstance or condition, we will provide some real-life examples of how our system works because, with that understanding, construction of programming to analyze sensor data and proactively identify circumstances or conditions that could result based upon that data can be implemented in a straightforward manner.

For these examples, presume a user with a reconfigurable instrument panel display initially specifies that the display should contain widgets for only the main elements typically found in an analog dashboard, e.g., speedometer, fuel gauge, and odometer.

In light of the above background, our system will now be discussed, first with reference to the end result of the operation of our system, and then with how the system accomplishes that end result.

Figure 2A:
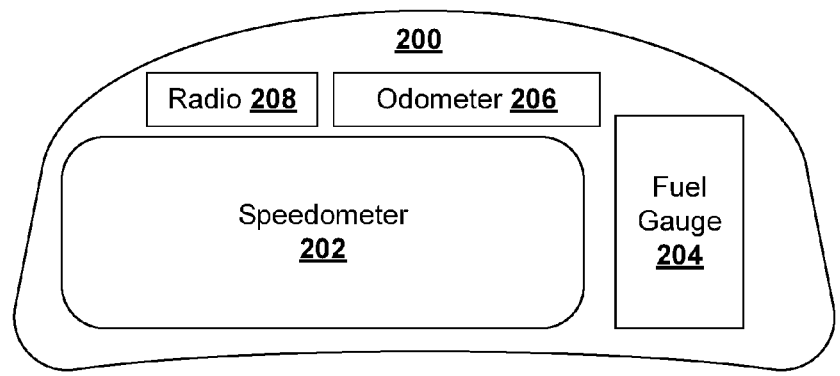
FIG. 2A illustrates, in simplified form, a representation of one example of a user-reconfigurable instrument panel display.

FIG. 2A illustrates, in simplified form, a representation of one example of a user-reconfigurable instrument panel display 200 configured by its user to contain only the speedometer widget 202, fuel gauge widget 204, odometer widget 206 and radio station widget 208 display elements.

Figure 2B:
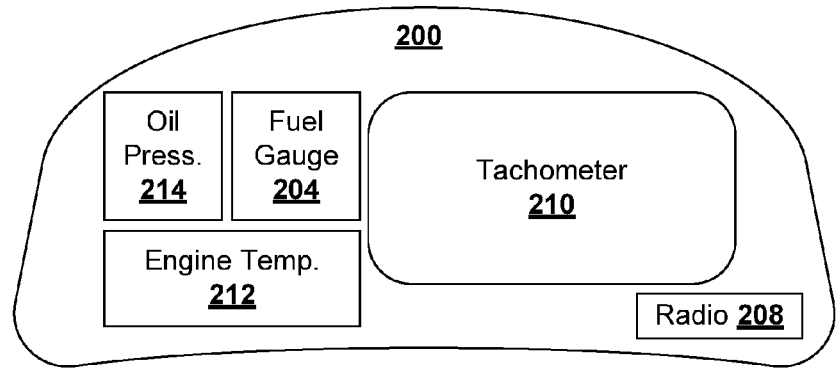
FIG. 2B illustrates, in simplified form, a representation of the instrument panel display after it has been automatically modified to take into account the changed circumstances.

While the configuration of FIG. 2A may be suitable for most of the user's typical driving, presume the user goes driving in the mountains. In that case, during the drive, input to the system from the various sensors might initially cause the system to determine that the vehicle is going uphill for longer than some threshold amount of time, in low gear, and that the exterior surrounding temperature is about 85 degrees. Thus, the system will determine that engine speed (RPMs), engine temperature, oil pressure and fuel usage should be of primary concern, and speed and total mileage is of negligible concern. This is because, during an uphill climb, the driving in a lower gear will cause the engine to rev higher to maintain speed, thereby taxing the engine more (causing it to run hotter). As a result, the driver should be monitoring the information provided by the gauges that are determined to be more important—and the system will automatically take action in that regard. FIG. 2B illustrates, in simplified form, a representation of the instrument panel display 200 after it has been automatically modified to take into account the changed circumstances just described.

Specifically, as shown in FIG. 2B, the system described herein has, automatically, and without any other action by the user, modified the display 200 to, in this case, remove the speedometer 202 and odometer 206 widgets and insert new widgets, namely, a tachometer widget 210 (for engine RPMs), an engine (coolant) temperature gauge widget 212, and an oil pressure gauge widget 214, while moving the current radio station widget 208 to a less prominent position because the radio is on at that time. Moreover, to fit the new widgets, the fuel gauge widget 204 has been resized. As noted above, this is because the tachometer widget 210, engine (coolant) temperature gauge widget 212, and oil pressure gauge widget 214 have been determined by the system to be more "important" than the speedometer 202 and odometer 206 widgets.

Now, presume that while continuing the drive, the elevation change results in the input to the system from the sensors that indicate the exterior temperature has dropped considerably to 31 degrees (as can happen in the mountains) and the climb has changed from a series of steep uphill sections of road, to a series of smaller inclines with acute turns in between (often referred to as "switchbacks"). Since the system is constantly monitoring the input from the various sensors, it determines that the circumstances have meaningfully changed again and that, as a result, the instrument panel display 200 must change as well.

Figure 2C:
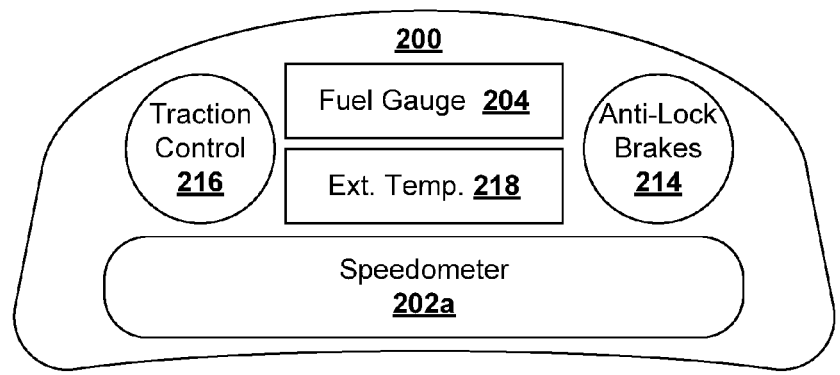
FIG. 2C illustrates, in simplified form, a representation of the instrument panel display after it has been automatically modified.

FIG. 2C illustrates, in simplified form, a representation of the instrument panel display 200 after it has been automatically modified to take into account the new change in circumstances.

Specifically, the tachometer 210 of FIG. 2B is now less important, due to the change in grade of the roads, and the engine (coolant) temperature 212 and oil pressure 214 of FIG. 2B are no longer considered relevant because the engine is not being taxed nearly as much. However, as a result of the sensor inputs, the system determines that the circumstances of the change in external temperature makes the possibility of sliding or skidding more likely. Indeed, the accelerometer, multi-axis, wheel and/or transmission sensor(s) may have even detected some sliding (sway and/or surge) or loss of traction. As a result, as shown in FIG. 2C, the system has determined a change in widget importance and, as a result, added an anti-lock braking system widget 214, a traction control system widget 216 and a widget 218 to show the external temperature, in order to keep the driver informed of the changed circumstances and more relevant information. In addition, since the importance of the speedometer widget 202 and fuel gauge widget 204 is still present (or the user's preference for those widgets can still be accommodated) a different style and/or size speedometer widget 202a and fuel gauge widget 204a have displayed, and, in the case of the fuel gauge 204a, it has been moved in order to fit the new widgets 214, 216, 218. Again, all of this happens automatically, and dynamically, in response to data received by the system from one or more of the sensors so that the most important information under the circumstances is displayed.

Now, presume that the driver keeps going, crests the mountain and begins to descend in elevation. by continually monitoring its input from the sensors, the system determines from the sensor inputs that the temperature has risen to about 40 degrees, and the vehicle is continually descending.

Figure 2D:
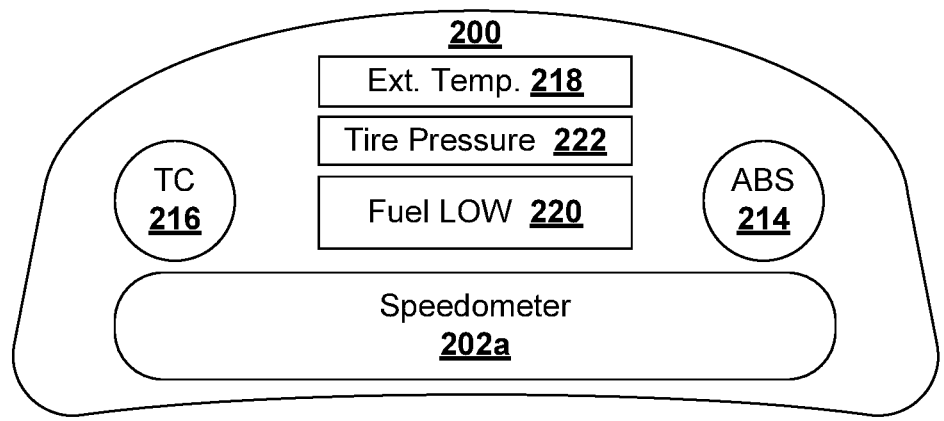
FIG. 2D illustrates, in simplified form, a further representation of the instrument panel display after it has been automatically modified.

FIG. 2D illustrates, in simplified form, a representation of the instrument panel display 200 after it has been automatically modified to take into account this change in circumstances. As a result, as shown in FIG. 2D, the anti-lock brake system (ABS) widget 214 and the traction control (TC) system 216 although still relevant, become less so, and so their size is reduced in the instrument panel display 200. However, due to the high engine speed and low gear used to climb the mountain and length of time needed to do so, the system has determined that the vehicle has burned a significant amount of fuel such that refueling is advisable. Note here that, with some implementations, GPS input may optionally be used to augment the determination because, for example, there may be a gas station nearby then, and the next gas station may be at a distance approaching the remaining range of the vehicle as then-determined. As a result, the fuel gauge has been replaced by a low fuel indicator warning widget 220 to prominently inform the driver of this circumstance. In addition, the system recognizes that the extreme changes in both temperature and elevation caused an issue with the tire inflation pressure. As a result, a tire pressure level indicator widget 222 becomes important and, thus, is prominently added to the instrument panel display 200 in a location reflecting its importance. In order to make room for the tire pressure level indicator widget 222. However, it is not possible to merely add that widget 222 while maintaining the other widgets 218, 222 with their size and positions of importance unchanged. As a result, the system determines that the external temperature widget 218 is less important and can be retained in its present location if it is reduced in size, and thus, reduces the size of the external temperature widget 218 to make room for the size and placement of the tire pressure level indicator widget 222 as shown.

Figure 2E:
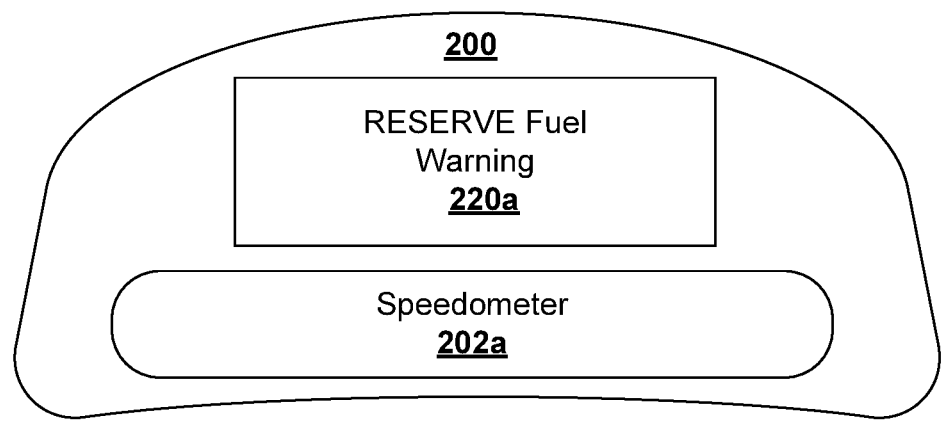
FIG. 2E illustrates, in simplified form, a representation of the instrument panel display after the fuel level becomes of primary importance.

Finally, presume that the driver ignores the low fuel warning indicator widget 220 of FIG. 2D and continues to drive. Some time thereafter, when the fuel level is very low, that becomes of primary importance and so the system automatically replaces all of the gauge widgets of FIG. 2D, except the speedometer widget 202*a*, with a "RESERVE Fuel Warning" 220*a* to inform the driver that they are into the reserve and must refuel as soon as possible. FIG. 2E illustrates, in simplified form, a representation of the instrument panel display 200 after the fuel level becomes of primary importance.

Note here that only the existence of fuel warning notification is conventional but such warning has never been coupled with modification of the location of the fuel-related widget within the instrument panel display 200. In addition, all of the other changes were based upon non-failure changes in circumstances (i.e., they were pro-active changes that inherently notify the driver of a possible future concern based upon present changing conditions) as a reflection of their potential importance.

FIG. 3 illustrates, in simplified form, a flowchart 300 of one example process for implementing the automatic pro-active modification of the instrument panel display based upon changed circumstances.

In conjunction with the flowchart of FIG. 3, it is to be understood that each widget that could be displayed in the instrument panel display 200 has an associated priority value that reflects the current priority of that widget relative to every other widget that can be displayed in the instrument panel display 200. That value reflects the current "importance" of the widget as determined by the system, irrespective of where and whether that widget is currently displayed in the instrument panel display 200 or a user's display preference settings. With this example implementation variant, the system uses the values to determine whether and where a given widget should be displayed in the instrument panel display 200, typically based upon comparison with a preset threshold value that determines whether a given widget is displayed or not). Initially, when the vehicle is turned on, the values are set such that the factory, dealer, or user specified widgets are the only ones that satisfy the display threshold requirement and, thus, appear in the instrument panel display 200 (i.e., they have the requisite importance values). Thereafter, receipt and analysis of the readings from the sensors will be used to modify the importance values to reflect a different priority for the widgets and thereby effect changes to the instrument panel display 200. With the foregoing in mind, the process will now be described.

After initial start, the process 300 begins with the system continually monitoring the sensors and widgets currently in the instrument panel display 200. This involves checking the outputs of the sensors input to the system to determine whether a condition has changed (Step 302). Specifically, this is done by recording the values from the sensors at each reading and with each new reading, comparing the new values with the prior values and/or some threshold value, or using the new values with some old values to detect a trend over some period of time (in absolute terms or relative to some threshold), and storing the new values. Depending upon the particular implementation, sensors and situations, the comparison may require analysis of a series of readings over time to make a determination, for example, to detect a temperature trend, incline change over time or fuel usage rate, not just the most recent reading against the immediately prior one, for example, an electrical system sensor.

If those values do not indicate a change in conditions, the system checks whether any instrument panel display widget has been added to the display 200, removed from the display 200 or moved to a new location in the display 200 (Step 304). If not, the process continues and loops back to Step 302.

In either case, if the input from the sensors indicates that the conditions did change, or if a widget was manually changed, the widget importance values are changed to reflect that change (Step 306). Then the system orders the widget according to the new importance values (Step 308) and checks whether any un-displayed widgets had a change in ordering (i.e., based upon importance value(s)) that requires display of any previously non-displayed widget(s) (Step 310). If not, the process returns to the loop that starts with Step 302.

If however, any previously un-displayed widgets now need to be displayed, the system checks whether there are any display "slots" available (Step 312). Note here that display "slots" are merely areas of sufficient size for the widget to be added without effecting any change, other than potentially movement of location, to any currently displayed widget, and irrespective of whether some rearrangement is necessary. Note further that, in general, display slots are denoted such that the slots closest to the center of the instrument panel display 200 receive the most important widgets and the slots farthest from the center of the instrument panel display 200 are where the lowest importance displayed widgets are located.

If a sufficient display slot is available, then the widget is added to the display based upon its importance value (Step 314), which may also involve moving one or more of the currently displayed widgets to some new location(s), and the process returns to the beginning of the monitoring loop (Steps 302).

If, however, there are no display slots available, the system checks whether there are any lower importance widgets currently displayed in the instrument panel display 200 (Step 316). If there are lower importance widgets currently displayed, the system determines whether the lowest importance widget(s) can be removed to create sufficient space for the new widget(s) to be displayed, for example, because one or more may no longer be relevant under the changed circumstances (Step 318). If one or more can be removed to provide sufficient space, then the lower importance widget(s) will be removed (Step 320) and the new widget is added to the display based upon its importance value (Step 314), which, as noted above, may also involve moving one or more of the currently displayed widgets to some new location(s). Again, the process returns to the beginning of the monitoring loop (Steps 302).

If, as a result of determining whether there are lower importance widgets currently displayed (Step 316) or if the lowest importance widget(s) cannot be removed under the circumstances (Step 318), then the system determines whether any of the widgets can be resized to allow the new widget(s) to fit (Step 322).

Depending upon the particular implementation, it should be understood that the resizing may involve replacing a widget with a different size of the same widget, actually shrinking the size of the widget, or replacing the widget with a different configuration or shape that may or may not be smaller but conveys the same or sufficiently analogous information. For example, a large essentially rectangular widget that displays a speedometer as a swept dial, might be shrunk down in size, or it might be replaced with a round dial shaped speedometer widget, or even a numerical speedometer representation.

If the displayed widget(s) can be resized, they are, typically by resizing the lowest importance widgets first and continuing until sufficient space is available (Step 324). Once there is sufficient space to accommodate the new widget(s) to display, the new widget is added to the display based upon its importance value (Step 314) which, again as noted above, may involve moving one or more of the currently displayed widgets to some new location(s). Finally, the process returns to the beginning of the monitoring loop (Steps 302).

Having described the modification of a vehicle display with respect to changes detect by certain sensors associated with the vehicle, its operation and performance under various circumstances, a further variant will now be described that deals with sensors relating to driver detection. Note here that this variant can be independently implemented or it can, in whole or part, be implemented in conjunction with the variants previously described.

Figure 4:
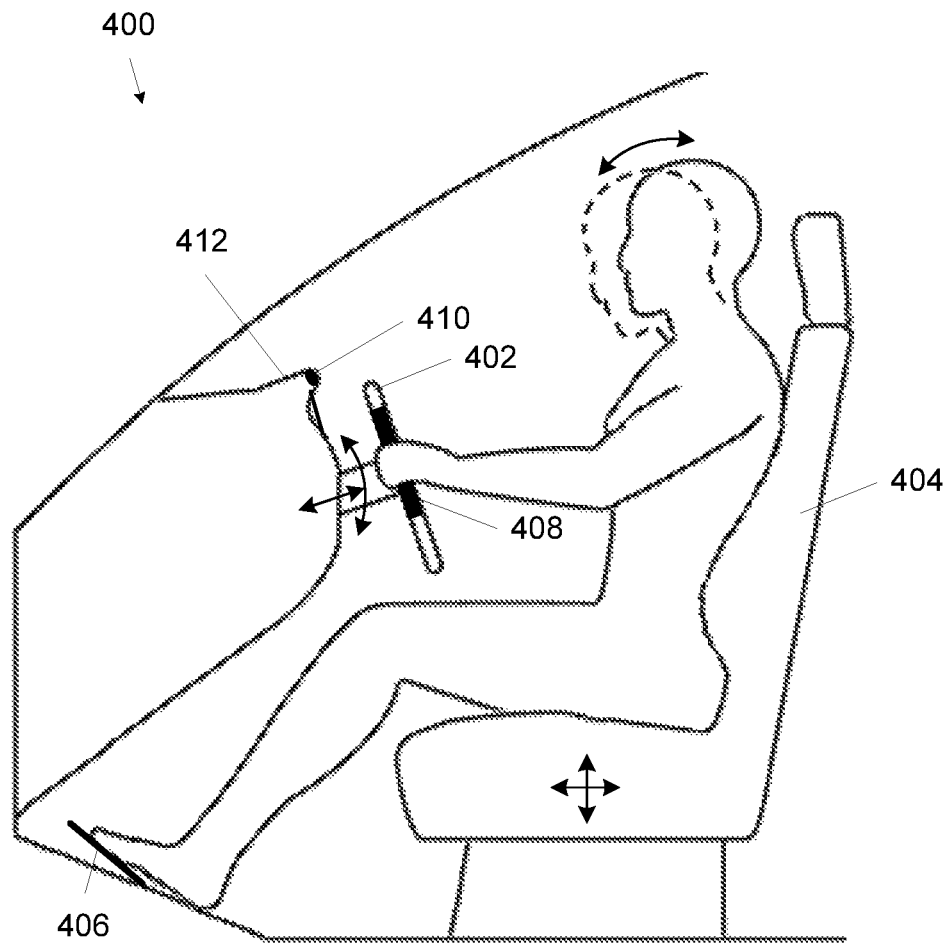
FIG. 4 illustrates, in simplified form, a portion of the driver's side of the interior of a passenger vehicle.

FIG. 4 illustrates, in simplified form, a portion 400 of the driver's side of the interior of a passenger vehicle. With reference to FIG. 4, it is well known that many passenger vehicles available today allow drivers to adjust the position of the steering wheel 402 up or down and, in some cases, towards or away from the driver as well. Likewise, the driver's seat 404 can be moved towards or away from the gas/brake/clutch pedals 406, and in some cases also up or down, so that the driver can find a configuration that suits their comfort and driving style.

Advantageously, by adding sensors 408 in the steering wheel 402, changes in the gripping force exerted by the driver for some period of time (e.g., a change from a relaxed grip with one hand to a tight grip at around the 3 and 9 o'clock positions) can be used to detect a change from leisurely driving to sport-style driving and can trigger an automatic change in the instrument panel display 200 from its then-current display to a pre-configured set of widgets that implement a set of sport gauges, for example, one or more of: speedometer, tachometer, current shift gear, lateral and longitudinal G-forces, acceleration rate, and/or lap timing, without any other actions on the part of the driver. The opposite can also be implemented (e.g., a change from tight grip to relaxed grip effecting a change from a sport gauge configuration to an alternative, more conventional, configuration of gauges).

As a separate matter, in some cases, the moving and/or resizing of instruments as previously discussed can result in a particular widget being re-located within the instrument panel display to a peripheral location, even though the driver may actually be interested in the information that widget is providing, such that the driver keeps diverting their eyes to it. Alternatively or additionally, by adding additional sensors 410 in the instrument display panel binnacle 412 and/or into instrument display panel itself that are directed towards the driver, the driver's pupils can be tracked such that, if a driver repeatedly looks at a particular gauge more than a specified number of times within a given time window or for longer than a specified period of time within a given time window (an individual look or as an aggregate of multiple looks) the widget for that gauge can be temporarily moved to a more prominent/centralized position within the instrument panel display 200.

Likewise, it is possible that the shrinking of an individual gauge, or certain lighting conditions, can result in a given gauge being difficult to see such that the driver may squint to see it. Advantageously, the sensors 410 that are directed towards the driver can be used to detect driver "squinting" and/or "leaning in" towards the instrument panel display and, in conjunction with pupil tracking, identify and enlarge the widget for the instrument of interest and, optionally with some implementation variants, if bright light is a factor, modify the brightness and/or contrast of the instrument panel display.

At this point it should be noted that the identification and tracking of facial expressions (e.g., squinting and/or facial movement), and pupil tracking, use known techniques such as described in, for example, U.S. Pat. No. 8,094,122, as well as U.S. Pat. No. 8,988,519 both incorporated herein by reference in their entirety, in addition to Moore et al., "Multi-View Pose and Facial Expression Recognition" Proceedings of the British Machine Vision Conference (2010), Nguyen et al., "Tracking Facial Features under Occlusions and Recognizing Facial Expressions in Sign Language" Proceedings of the Conference on Face & Gesture Recognition FG2008, pp. 1-7 (2008), and Kapoor et al., "Fully Automatic Upper Facial Action Recognition" IEEE International Workshop on Analysis and Modeling of Faces and Gestures (October 2003), to name a few. Since those or similar known techniques can be straightforwardly adapted for use as described herein, in the interest of brevity the details are not described herein.

Figure 5A:
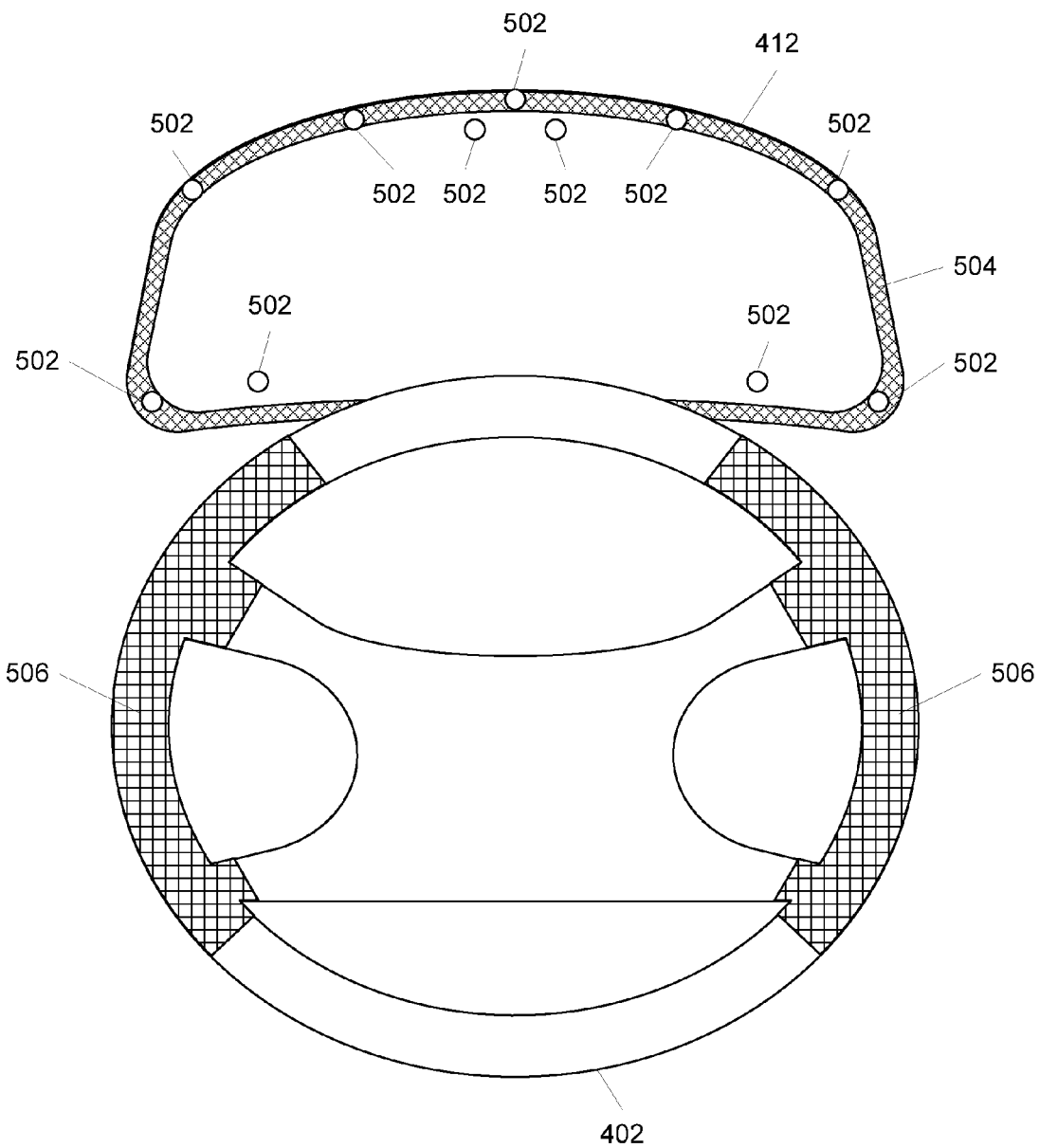
FIG. 5A illustrates, in simplified form, an example variant instrument panel display, its surrounding binnacle and a steering wheel, for a system implementing grip-sensing and driver tracking aspects.

FIG. 5A illustrates, in simplified form, an example variant instrument panel display 200, its surrounding binnacle 412 and a steering wheel 402, for a system implementing grip-sensing and driver lean-in and/or squint tracking aspects as just described.

As shown, the instrument panel display 200 includes multiple sensors 502 in the display 200 that are used to perform one or more of pupil tracking, squinting or driver "lean-in" identification as described above. Likewise, or alternatively, the binnacle 412 can include the necessary sensors 502, for example, in any of the locations indicated or somewhere else within the binnacle 412 such as a portion 504 identified in FIG. 5A by angled cross-hatching. In still other variants, the sensors 502 can be located in some other appropriate location within the vehicle. Thus, while as shown in FIG. 5A, the sensors 502 are located in various location within the display 200 and/or binnacle 412, it is to be understood that no particular number or location of sensors 502 is required. Rather, it is expected that different implementations, may use different sensor placement and/or numbers to accomplish the pupil tracking, squinting or driver "lean-in" identification as described above.

The sensors 502 themselves can be any of a number of sensors (or combination(s) thereof) including, for example, camera(s), infrared, or any other sensor(s) that can be used to identify the distance to an object or for purposes of pupil tracking. Some examples of sensors and pupil tracking techniques using such sensors are described in, for example, U.S. Pat. No. 8,185,845, U.S. Pat. No. 5,360,971 and U.S. Pat. Pub. No. 20100231504, incorporated herein by reference in their entirety.

Similarly, the steering wheel 402 is equipped with resistive, capacitive or other sensors located within at least an area 506 encompassing between the 2 o'clock and 5 o'clock positions on the right side of FIG. 5A and the 7 o'clock and 10 o'clock positions on the left side of FIG. 5A. The sensors are used to detect the driver's hand location and their grip pressure. The grip pressure is then compared to a threshold to determine whether to change the display. Depending upon the particular implementation, since the driver's grip will naturally vary during both leisure and sport driving, and since the position of the driver's hands are not necessarily themselves indicative of leisure or sport driving, a presumption can be made, for example, that when both hands are at about the 3 o'clock and 9 o'clock positions the driver intends sport driving and if, in combination, the grip pressure meets a specified threshold for some period of time, the display will be changed. This may be accomplished, for example, by averaging the measured grip pressures within a time window, by sampling grip pressure within a window, or other appropriate means and if the change is warranted, changing the importance values such that the sport (i.e., grip-based) widget configuration is displayed.

Figure 5B:
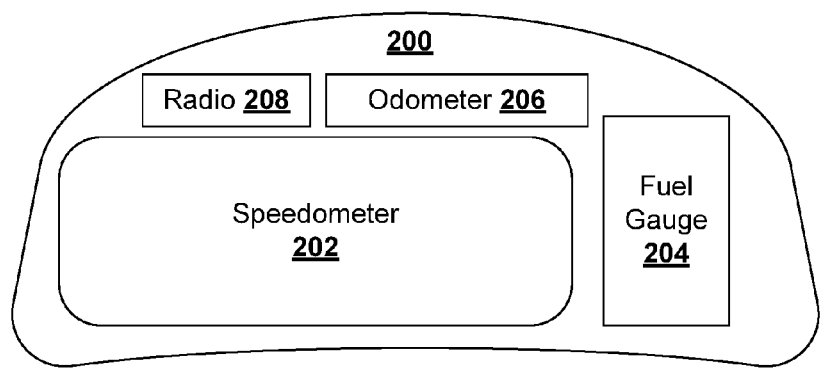
FIG. 5B illustrates, in simplified form, an example configuration of widgets in an instrument panel display corresponding to a leisure driving condition in a system configured as shown in FIG. 5A.

FIG. 5B illustrates, in simplified form, an example configuration of widgets in an instrument panel display corresponding to a leisure driving condition in a system configured as shown in FIG. 5A. When the driver grip location and pressure indicate a change to sport driving, the display, for example the display of FIG. 5B, will automatically change to a pre-configured sport widget configuration.

Figure 5C:
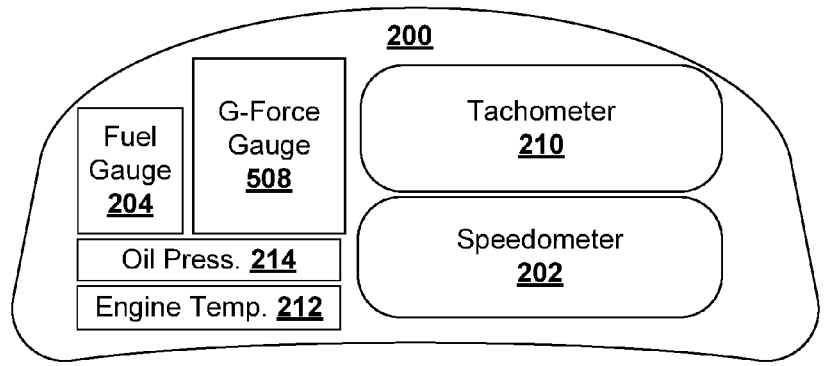
FIG. 5C illustrates, in simplified form, an example of a sport configuration of widgets in an instrument panel display that might replace the leisure configuration of FIG. 5B.

FIG. 5C illustrates, in simplified form, an example of a sport configuration of widgets in an instrument panel display that might replace the leisure configuration of FIG. 5B. As can be seen in FIG. 5C, certain gauges have been removed, others have been moved and/or resized and a new gauge, a G-force gauge 508 has been added.

Figure 5D:
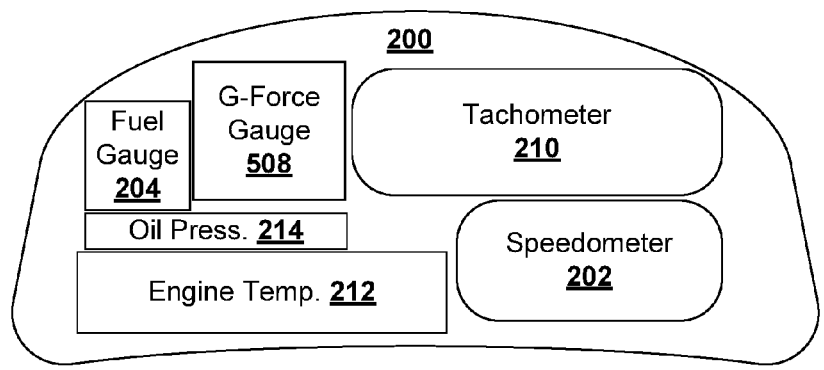
FIG. 5D illustrates, in simplified form, the display of FIG. 5C as a result of a driver squint and/or lean-in directed towards the engine temperature gauge 212 of FIG. 5C.

Presume that, for example, during the sport driving, the driver squints at and/or leans-in towards the Engine temperature gauge 212. Sensors such as shown in FIG. 5A can be used to detect that action and the widget to which it is directed and the system will temporarily enlarge (and possibly brighten, if the lighting level is high) that widget while temporarily moving and/or resizing other widget(s) as necessary to accommodate that enlargement. FIG. 5D illustrates, in simplified form, the display of FIG. 5C as a result of a driver squint and/or lean-in directed towards the engine temperature gauge 212 of FIG. 5C. Once the driver's look is no longer directed to that widget for some specified period of time, the display will revert back, in this example, to the display of FIG. 5C. Note here that, while the squint/lean-in aspect is illustrated in conjunction with a sport display, that aspect could be implemented such that it applies at any time, and in systems that do not implement grip sensing or a grip-based display change.

Figure 6:
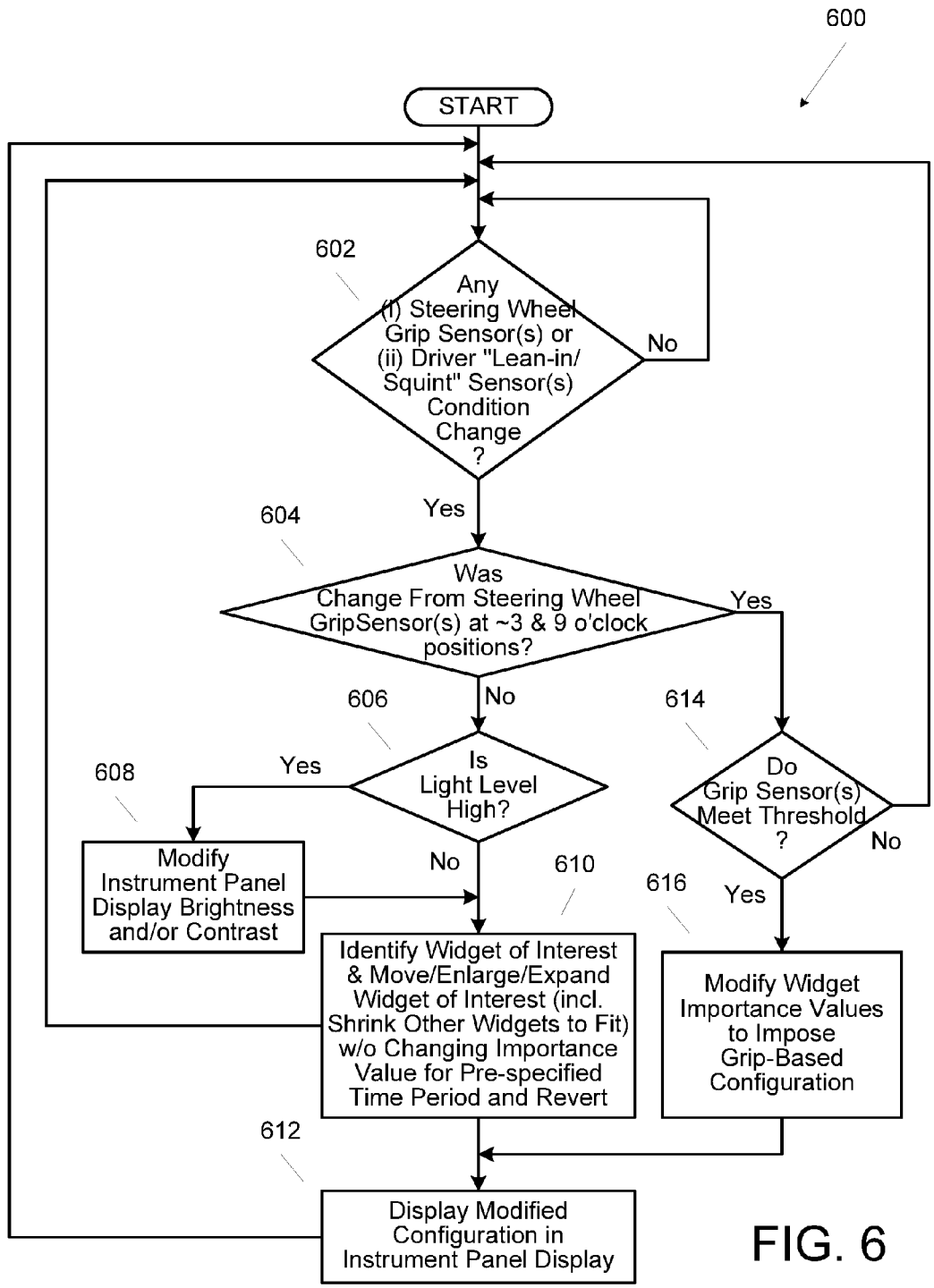
FIG. 6 illustrates, in simplified form, a flowchart of one example process for implementing the grip pressure and lean-in/squint process.

The foregoing process will now be described with reference to FIG. 6 which illustrates, in simplified form, a flowchart 600 of one example process for implementing the grip pressure and lean-in/squint process described above.

The process starts with a loop of the system determining, using the appropriate sensors, whether a changed condition was indicated by one or both of the steering wheel grip sensor(s) (506 of FIG. 5) or the driver lean-in/squint sensor(s) (Step 602). If no change was indicated the process loops back. If a changed condition was indicated, the system determines whether the change was from the steering wheel grip sensor(s) that indicated gripping with both hands at approximately the 3 o'clock positions and the 9 o'clock positions (Step 604). If not, then it is presumed that the change was due to the lean-in/squint sensor(s). Using the appropriate interior sensor's within the vehicle, the system then checks whether the light level impinging on the display in the interior is high (Step 606). This is because the lean-in and/or squint may not be due to the widget size, but rather due to the position of the sun shining into the vehicle. If the light level is high, the brightness and/or contrast of the instrument panel display 200 (Step 608). If the light level is not high, then no change to brightness and/or contrast will be needed. Thereafter, in either case, the system will identify the particular widget of interest using pupil tracking and temporarily move, enlarge or expand the widget of interest for some pre-specified time period while, if necessary, shrinking other widgets to make room (Step 610). Note, with many implementations, this will be accomplished without changing the importance values for the impacted widgets, although, with some implementations, the pre-change widget state can be stored and the importance values temporarily changed to effect the changed display. Once the pre-specified time period has elapsed, the pre-change widget state can be restored to effect a change back.

However the widget change is effected, the modified configuration is then displayed in the instrument panel display 200 (Step 612).

Returning back to Step 604, if the steering wheel grip sensor(s) did indicate gripping with both hands at approximately the 3 o'clock positions and the 9 o'clock positions, the gripping force (over some period of time and/or number of samples) is compared to some threshold value (step 614) in order to determine whether this is a temporary condition caused by, for example, an evasive or passing maneuver, or an intent to change to a "sport" condition. If the former, no change is made and the process loops back to the start again. However, if the threshold is met, the widget importance values are modified to impose the grip-based (e.g., "sport") widget configuration in the display (Step 616) and the modified configuration is then displayed in the instrument panel display 200 (Step 612).

Note here that, depending upon the particular implementation, the grip-based configuration can stay in force for a specified period of time, until a particular event happens (e.g., shutting off the engine, placing the gear shift in "park" (for an automatic transmission vehicle), standing still for longer than some specified period of time, change in hand position and/or grip pressure for longer than some specified period, etc.).

Through adding sensors 502 into and around the instrument panel display 200, additional features and more sophisticated variants can be constructed and deployed, for example, to address circumstances where an obstacle may temporarily block some portion of one or more widgets in the instrument panel display 200. An example variants incorporating this aspect will now be described bearing in mind that this variant can be implemented by itself or in combination with the foregoing approaches.

With this variant, in overview, the system will use sensors 502 in and/or around the instrument panel display 200 and/or dashboard to determine the drivers eye positions to identify when any obstacle is between the drivers eyes and any widget(s) displayed in the instrument panel display 200 and, if the widget has a high importance, move it to an unblocked region of the instrument panel display 200.

To accomplish this, the system would use the sensors 502 to map out the location and distance of an object from the dashboard and the driver's eyes using, for example, camera(s) and/or infrared, as well as perform pupil tracking and/or and facial recognition (using known techniques). Such obstacles may include, for example, the steering wheel rim, objects placed on the steering wheel or within the binnacle area or somewhere else between the line of sight of the driver and any widget(s). If the system determines that an obstacle is in the way of a particular dashboard widget (like the speedometer or fuel gauge) based upon, for example, the steering wheel location or steering column tilt obtained using, for example, a camera's view from the instrument panel display to towards the driver, an infrared distance sensor, etc., the system would move that widget to a new location for the duration of the existence of the obstruction. Depending upon the circumstances and implementation, this could also involve shrinking one or more unblocked widgets to make room for the blocked widget, moving one or more unblocked widgets of lesser importance to a new location, or even removal of one or more unblocked widgets from the display entirely.

Advantageously, to the extent a secondary display is available, for example, in a part of the center console or other part of the dashboard, a significant obstruction could result in the system moving or duplicating the blocked widget(s) in the secondary display.

The sensors 502 (camera, infrared, or similar) are located in key locations throughout the dashboard and/or instrument panel display. Typically, but not necessarily there would be at least one sensor either for each dashboard widget (gas, speed, rpm, oil pressure, etc) or for each display slot. The sensors are used to determine where the driver is, their angle of view, distance and focus of attention. The sensors 502 will also detect the presence and location of, for example, part of a steering wheel or other objects between the driver and instrument panel display.

If the system determines that a direct line of sight between any important widgets and the driver is blocked by an obstruction, the system will move the blocked widget to a new location that remains obstruction free and will adjust or remove other lower importance widgets as necessary to accomplish this.

This operation will now be described with reference to FIGS. 7-9.

Figure 7:
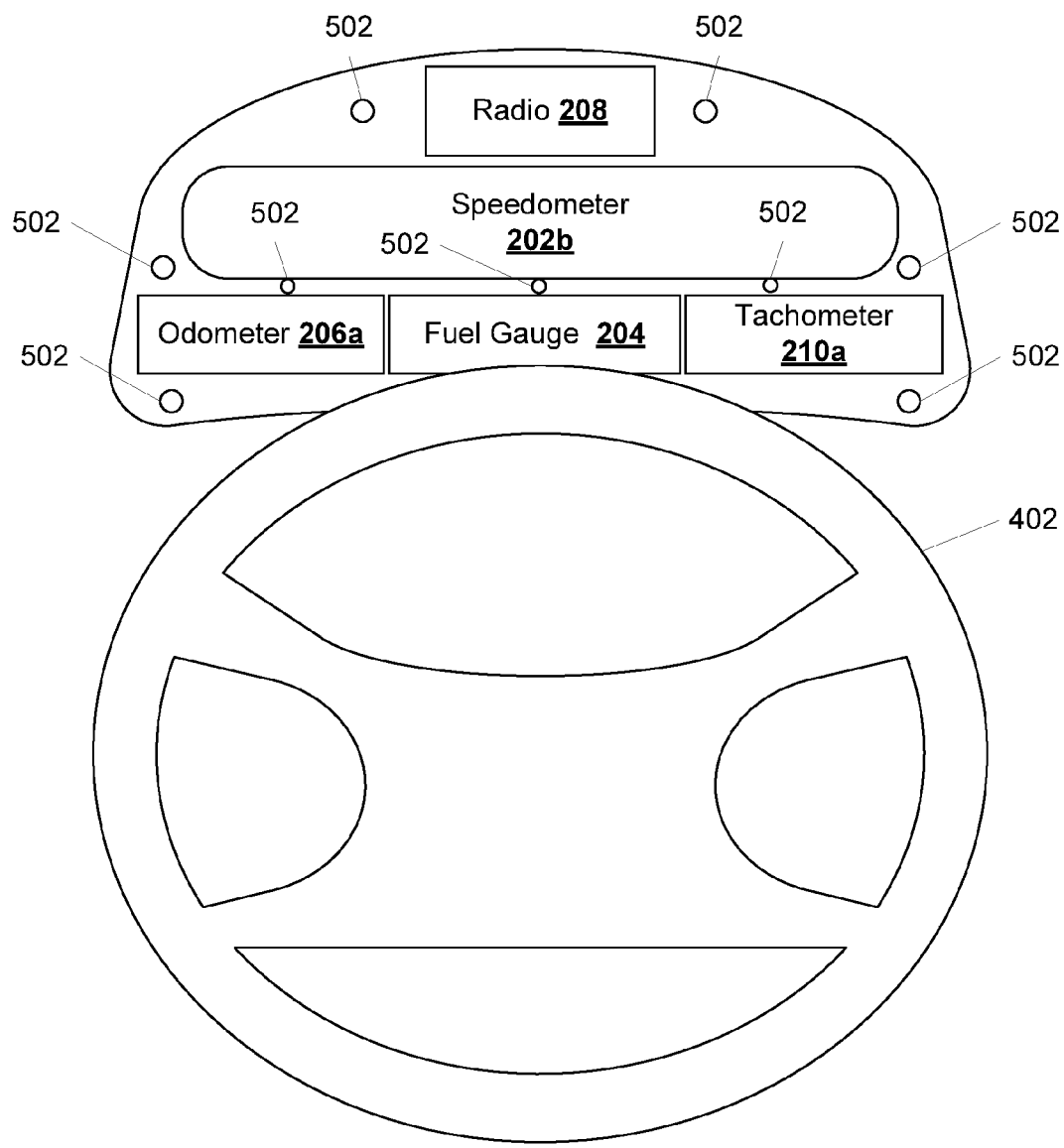
FIG. 7 illustrates, in simplified form, a driver's perspective of an example of a vehicle dashboard and instrument panel display of a system implementing a widget obstruction avoidance approach.

FIG. 7 illustrates, in simplified form, a driver's perspective of an example of a vehicle dashboard and instrument panel display 200 of a system implementing a widget obstruction avoidance approach as described herein. As shown, the instrument panel display 200 includes multiple sensors 502 and displays several widgets implementing different gauges and information provision elements in the instrument panel display 200, specifically, a speedometer 202b, a fuel gauge 204, a tachometer 210a, an odometer 206a and a radio station indicator 208. As shown, the position of the steering wheel 402 is such that none of the widgets are obstructed.

However, presume that the driver then adjusts the steering wheel 402 upwards.

Figure 8:
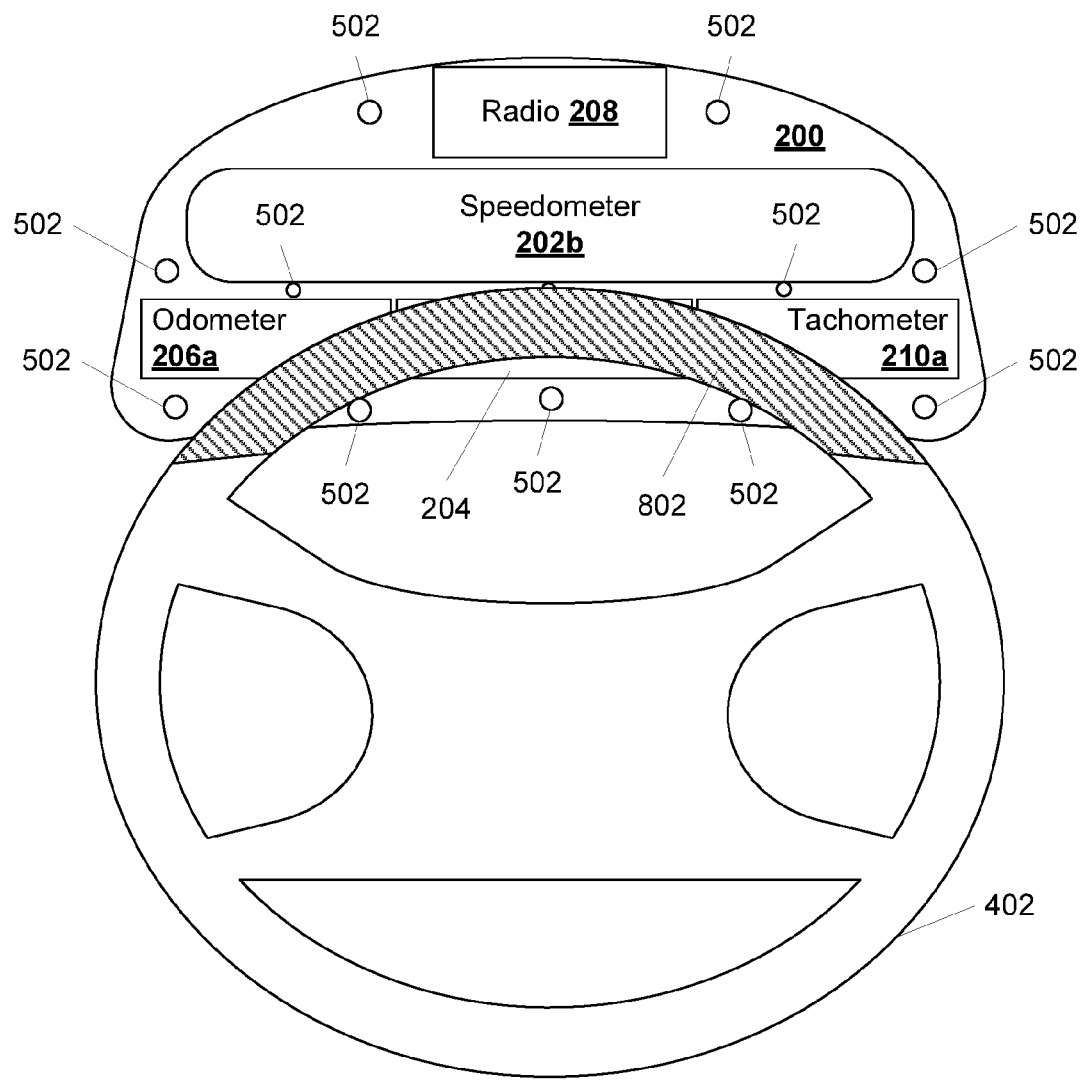
FIG. 8 illustrates, in simplified form, the example vehicle dashboard and instrument panel display of FIG. 7 after the steering wheel has been moved up.

FIG. 8 illustrates, in simplified form, the example vehicle dashboard and instrument panel display 200 of FIG. 7 after the steering wheel 402 has been moved up. As can be seen, a portion 802 (identified by angled hatching) of the steering wheel 402 now fully obstructs the widget 204 for the fuel gauge from the driver's view and also obstructs a substantial portion of the widget 206a for the odometer and widget 210a for the tachometer from the driver as well.

Using the sensors 502, the system detects that there is an obstruction between the driver's eyes and certain gauges. As a result, the system modifies the importance values for the fully/partially blocked widgets 204, 206a, 210a and thereby makes modifications necessary to provide an unobstructed view of those widgets to the driver.

Figure 9:
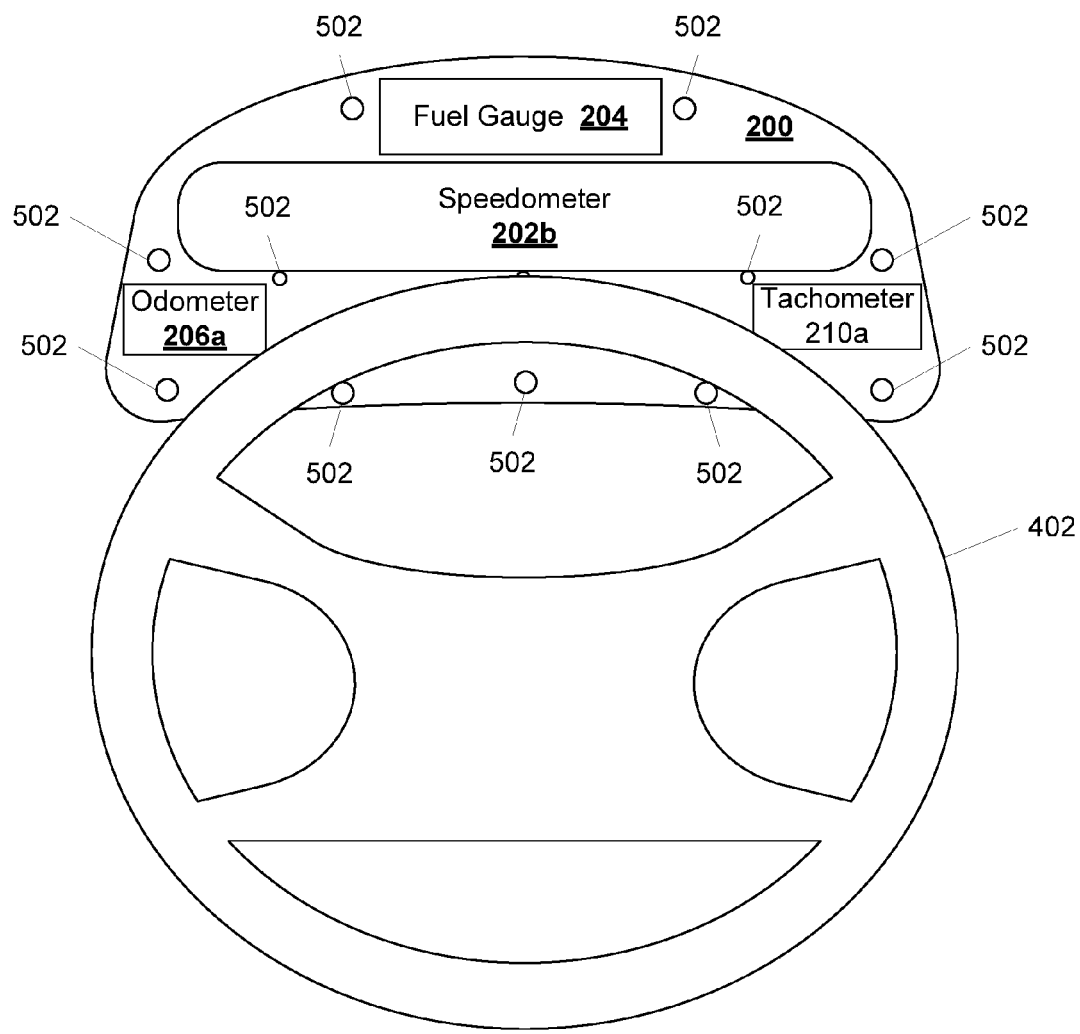
FIG. 9 illustrates, in simplified form, the example vehicle dashboard and instrument panel display of FIG. 8 resulting from the change in importance values.

FIG. 9 illustrates, in simplified form, the example vehicle dashboard and instrument panel display 200 of FIG. 8 resulting from the change in importance values. As shown in FIG. 9, due to it having a low importance, the radio widget 208 (shown in FIG. 7) has been removed and replaced with the previously fully obstructed fuel gauge 204. In addition, the widgets for the odometer 206a and tachometer 210a have been shrunk so that now the driver has a substantially unobstructed view of them.

Figure 10:
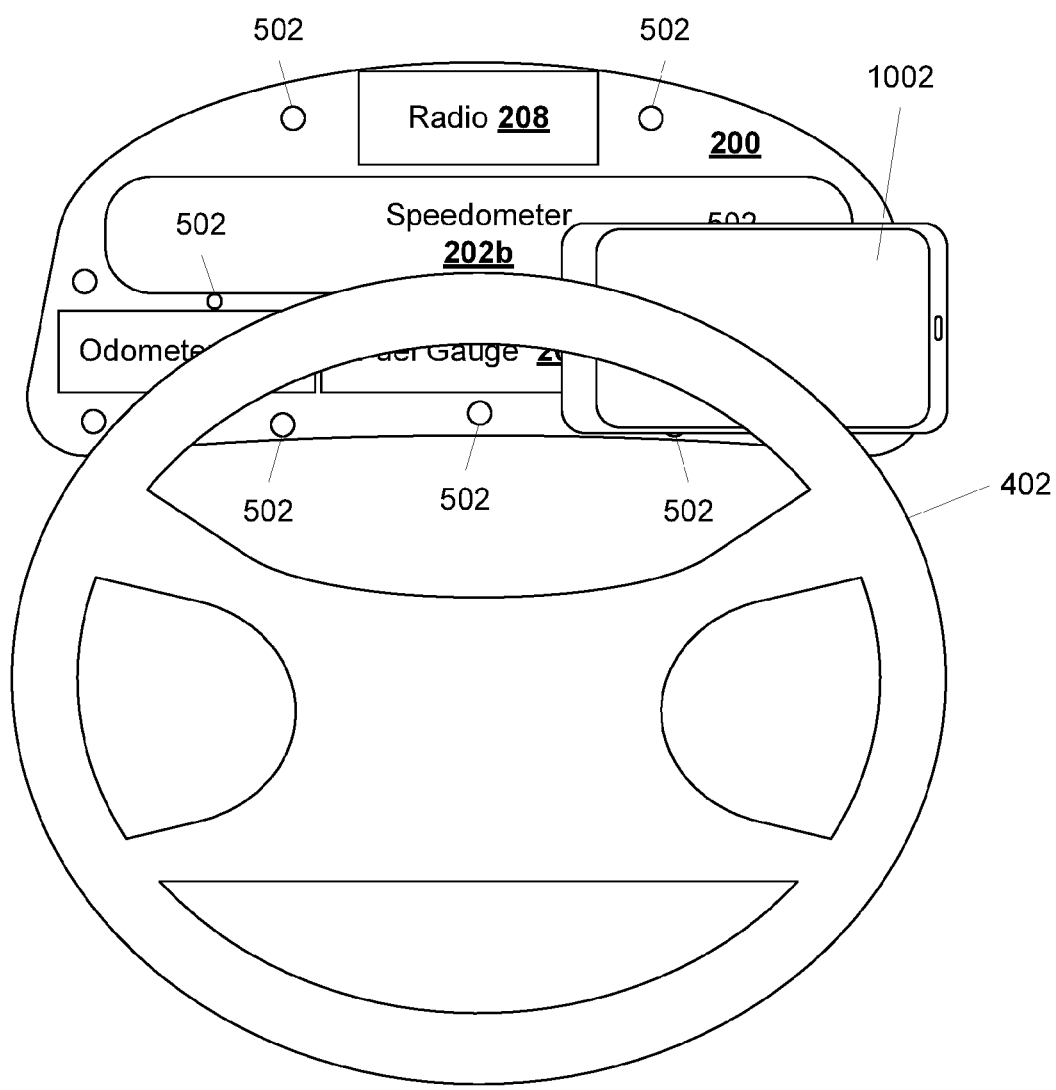
FIG. 10 illustrates, in simplified form, the example vehicle dashboard and instrument panel display of FIG. 7 immediately after the driver has moved the steering wheel and placed their phone on the dashboard.

The same approach can be used for temporary obstructions as well. Thus, presume that the configuration of FIG. 7 is in place, but in addition to moving the steering wheel 402 up, the driver places their cell phone 1002 on the dashboard, for example, to use it for GPS navigation. FIG. 10 illustrates, in simplified form, the example vehicle dashboard and instrument panel display 200 of FIG. 7 immediately after the driver has moved the steering wheel 402 and placed their cell phone 1002 on the dashboard. As shown in FIG. 10, only the widget 208 for the radio information is entirely unobstructed.

As before, the system will detect, via the sensors 502 that multiple widgets are obstructed and will modify their importance values such that the highest importance value widgets are displayed. As a result, the widget 204 for the fuel gauge remains in place as is, the widget 202c for the speedometer is shrunk down and moved, and the widget 210a for the tachometer is moved to an unobstructed location based upon their importance values.

Had this been the only display, that would be the end until at least the obstructing cell phone 1002 was removed. Advantageously, with some variant implementations, if there is a secondary display, for example, located in the center console area that is accessible to the system, lower priority widgets can be moved there.

Figure 11:
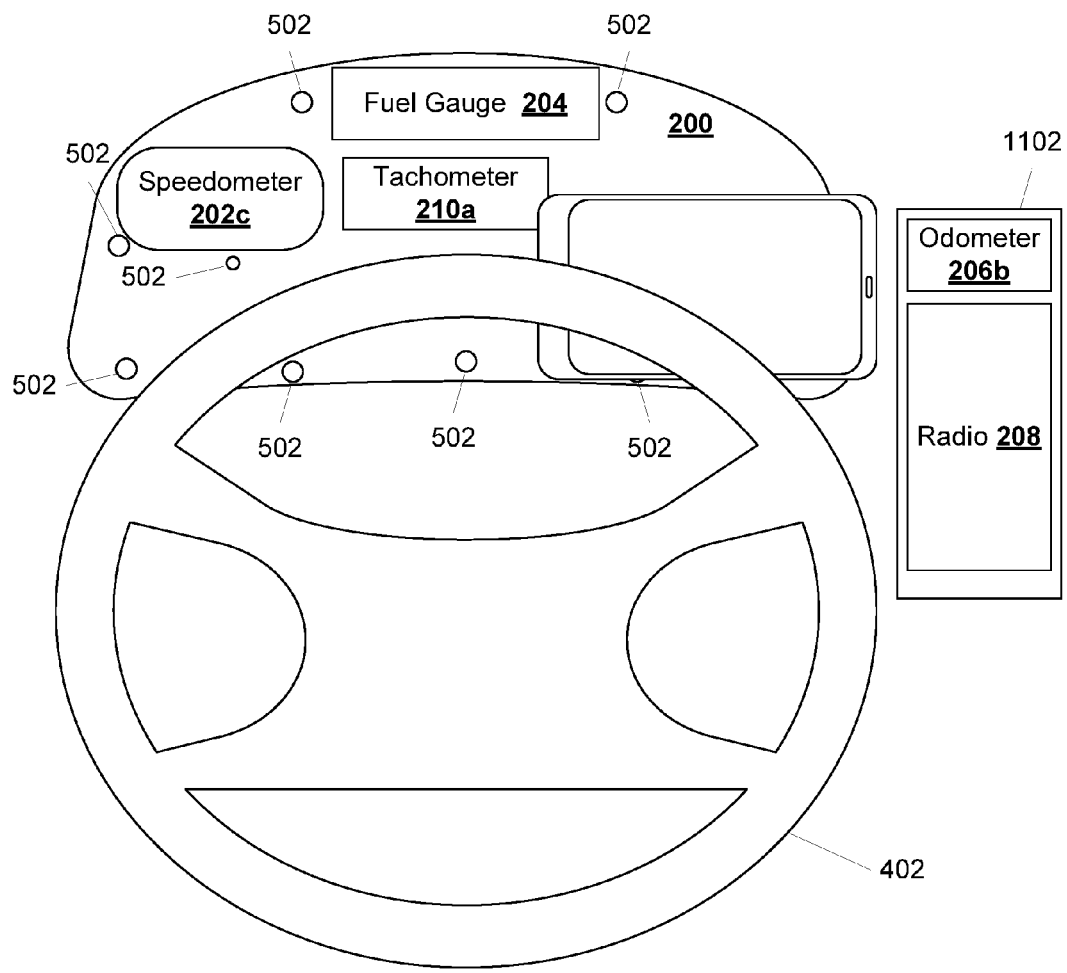
FIG. 11 illustrates, in simplified form, an alternative example a vehicle dashboard and instrument panel display identical to that of FIG. 10 except this vehicle also includes a secondary display.

FIG. 11 illustrates, in simplified form, an alternative example a vehicle dashboard and instrument panel display 200 identical to that of FIG. 10 except this vehicle also includes a secondary display 1102. As a result, as shown in FIG. 11, lower priority widgets for the odometer 206b and radio 208 that were removed from the instrument panel display 200 are relocated to the secondary display 1102.

Figure 12:
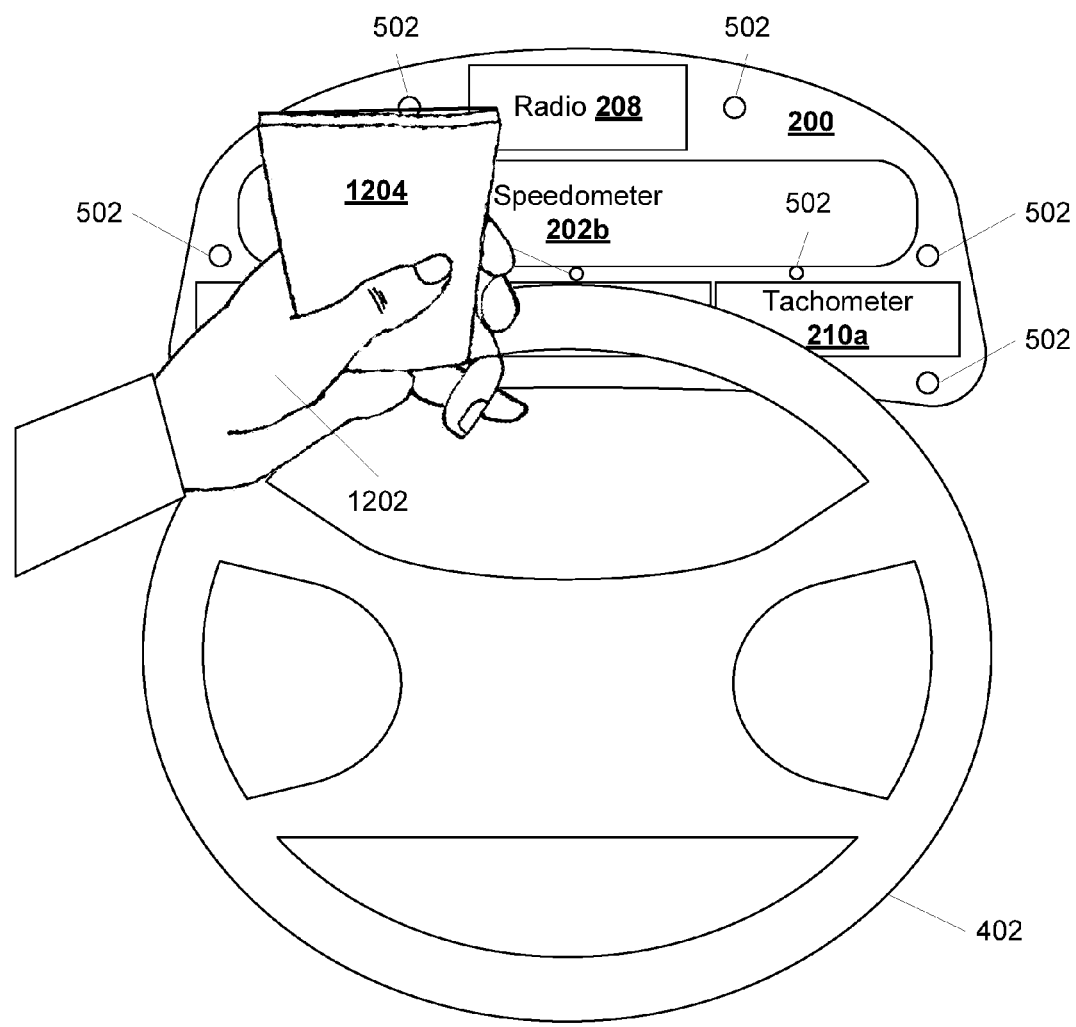
FIG. 12 illustrates, in simplified form, the example vehicle dashboard and instrument panel display of FIG. 7 that is temporarily partially obstructed.

The same approach can be used for more fleeting obstructions. FIG. 12 illustrates, in simplified form, the example vehicle dashboard and instrument panel display 200 of FIG. 7 that is temporarily partially obstructed, in this case by the driver's hand 1202 and coffee cup 1204. Advantageously, to avoid annoying or distracting the driver, the system can be constructed such that an obstruction must be present for at least a specified amount of time before changing the widget importance values to effect a change in the instrument panel display 200. Thus, if the driver's hand obstructs part of the display for less than that period of time, the display will remain unchanged. However, if the driver's and remains in that position for, depending upon implementation variant, longer than a specified period of time or more than a certain percentage of a sliding time-window, the importance values will be changed. Likewise, in the interest of avoiding annoying or distracting the driver the display will not be changed back until an obstruction no longer exists for some specified period of time. In this way, if the driver is drinking their coffee, the changing obstruction caused by the back and forth motion of the hand and cup 1202, 1204 between the driver's mouth and the resting place on the steering wheel 402 of FIG. 12 will not result in a regularly changing display.

Figure 13:
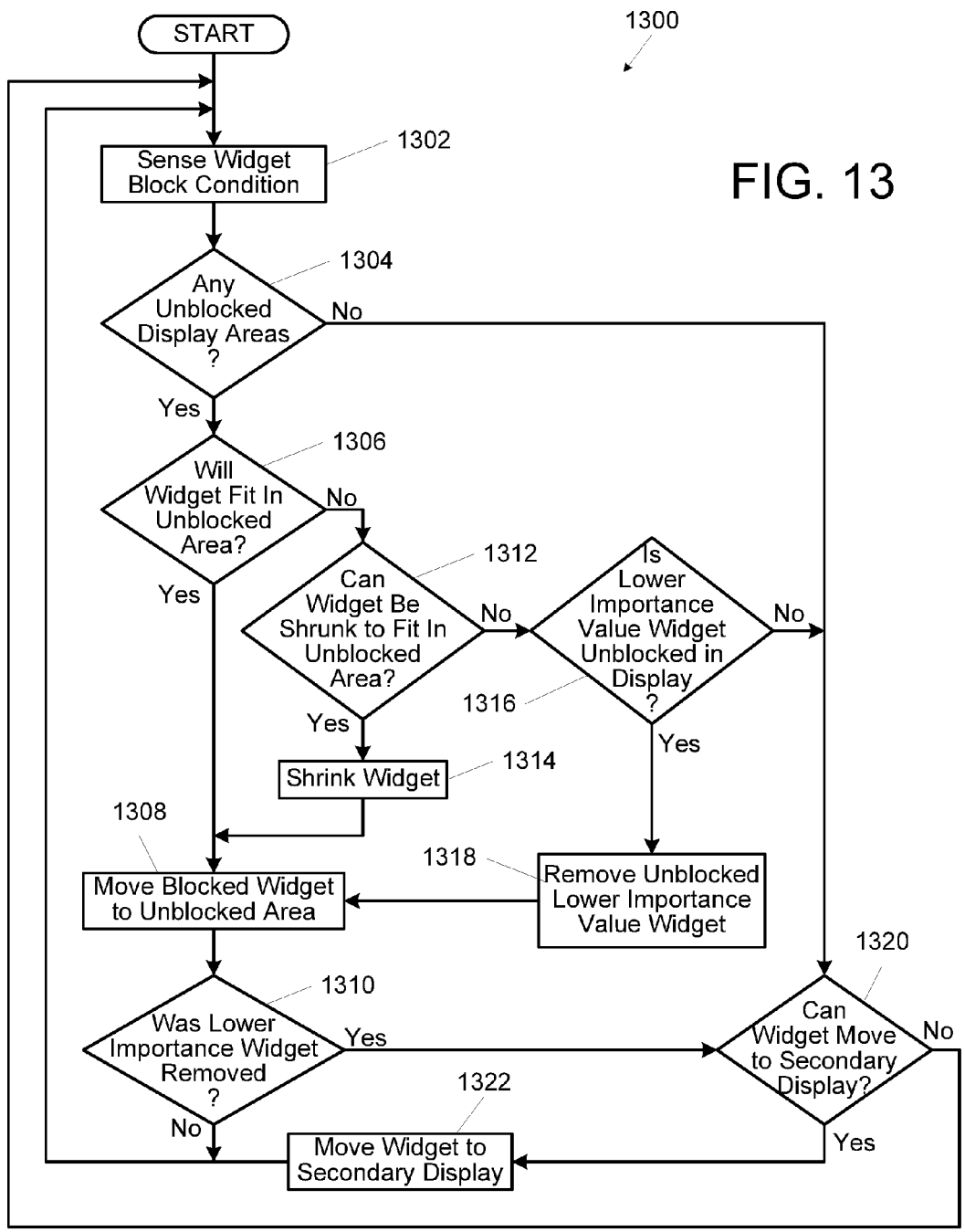
FIG. 13 illustrates, in simplified form, a flowchart of one example process for implementing the widget obstruction handling process.

FIG. 13 illustrates, in simplified form, a flowchart 1300 of one example process for implementing the widget obstruction handling process.

The process begins with the system determining, using the sensors 502, obstruction of one or more widgets (Step 1302). Typically on an importance value basis for each obstructed widget, the system will then identify whether any areas of the instrument panel display are not obstructed (Step 1304). If there are any unobstructed areas, the system determines whether the widget(s) will fit in the unobstructed area (Step 1306).

If the widget will directly fit in the unobstructed area, it is moved to the unobstructed area (Step 1308). If the widget can be shrunk to fit in the unobstructed area (Step 1312) the widget will be shrunk (Step 1314) and then moved to the unobstructed area (Step 1308).

If, however, the widget cannot be shrunk to fit in the unobstructed area, the system checks to see if there is an unobstructed lower importance value widget in the display (i.e., one that can be replaced to make room) (Step 1316). If there is such a lower importance widget, the lower importance widget is removed (Step 1318) and the obstructed widget (full size or shrunken as necessary) is inserted in the display in its place (Step 1308).

Following Step 1308, the system will check if a lower importance value widget was removed (Step 1310) and, if not, the process returns to the start. If either, as a result of Step 1304, Step 1310 or Step 1316, a secondary display 1102 is present, the system will determine if the removed widget can be moved to the secondary display 1102 (Step 1320). If there is no secondary display 1102, then the process returns to the start. If there is a secondary display to which the widget of interest can be moved, the widget is moved to that secondary display 1102 (Step 1322).

Having described various examples from the user perspective, the configuration of the system will now be discussed with reference to FIG. 14 and FIG. 15.

Figure 14:
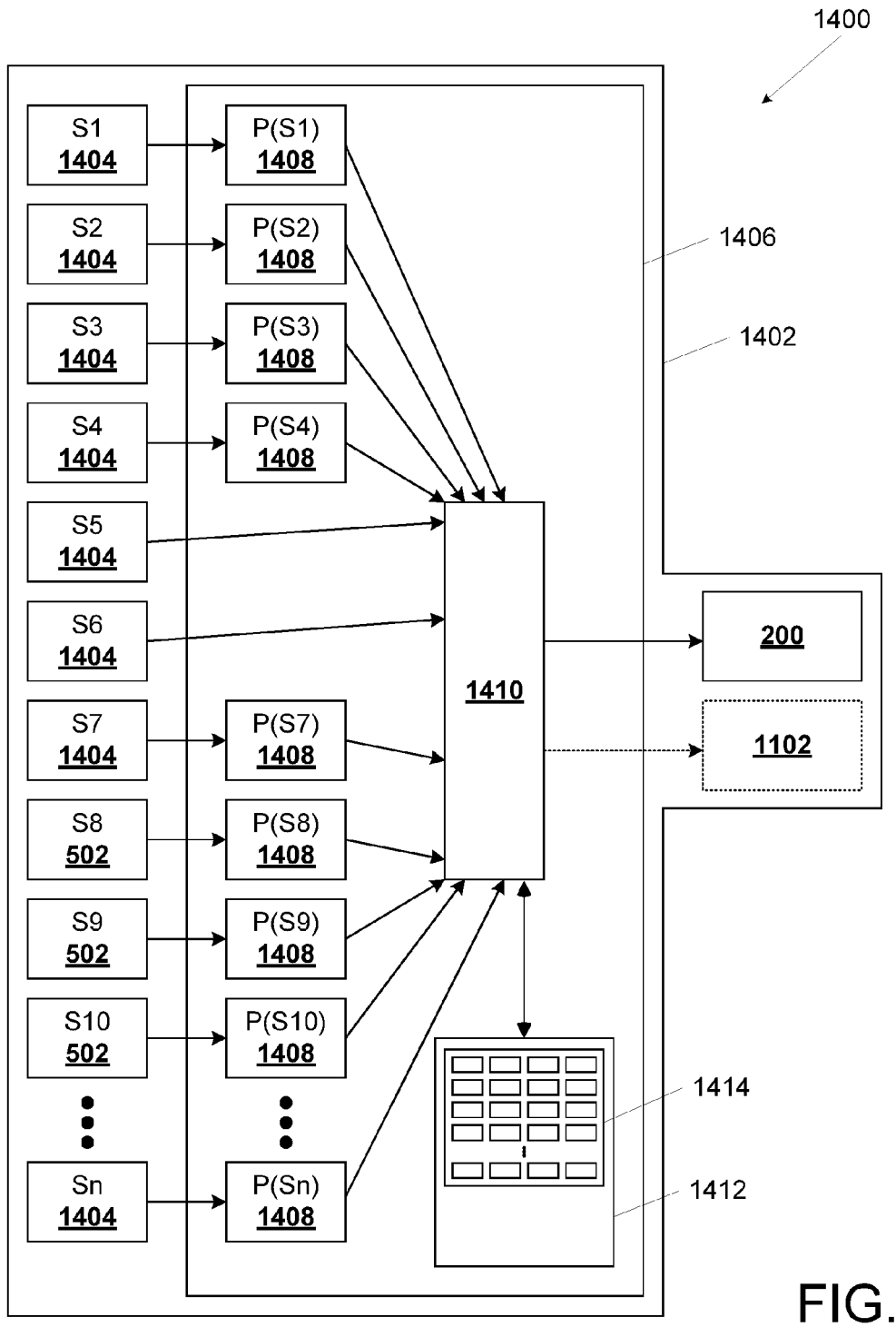
FIG. 14 illustrates, in simplified form, an in-vehicle system 1400 implementing the operation and processes of any of the variants described herein.

FIG. 14 illustrates, in simplified form, an in-vehicle system 1400 implementing the operation and processes of any of the variants described herein.

As shown in FIG. 14, the system 1400 is located in a vehicle 1402 and is made up of multiple sensors (S1, S2, S3, . . . , Sn) 1404, 502, that are fed to a processing system 1406. Such sensors may include, for example, door sensors, charging system sensors, batter sensors, tire sensors, vehicle speed sensors, engine RPM and temperature sensors, tire temperature and/or pressure sensors, brake sensors chassis sensors, coolant temperature and level sensors, exterior temperature sensors, transmission sensors, wheel slip sensors, rain or other weather sensors, sensors that receive GPS and/or traffic information, vehicle acceleration and/or orientation sensors, etc., and more particularly, each may be an engine speed sensor, a sensor for coolant level, a coolant temperature sensor, an oil temperature sensor, an oil level sensor, a throttle position sensor, an ammeter, a voltmeter, a vehicle speed sensor, a tire inflation pressure sensor, a wheel slip sensor, a steering angle sensor, a steering torque sensor, a suspension travel sensor, a fuel tank content level sensor, a traction control sensor, a thermometer, a microphone, a multi-axis sensor, and accelerometer, a gas sensor.

The processing system 1406 is made up of a set of sensor output handling units P(S1), P(S2), P(S3), . . . , P(Sn) 1408 that are implemented in hardware and/or software and operate to functionally receive the output from certain sensors, if needed, to convert, scale and/or manipulate the output of any sensors 1404, 502 into a form that can be used by a processor to make the determinations as described herein.

Depending upon the particular implementation variant, the function of a sensor output handling unit 1408 can be part of the sensor itself, such that the sensor outputs data that is directly usable by a processor, or one or more separate units that receive the output directly from the sensors 1404, 502 and operate on that output, or implemented by one or more processor(s) 1410 within the processing system 1406. Likewise, since many vehicles already incorporate such sensors and processor(s) to process the sensor output in order to provide failure warnings, the operation of the sensor output handling units P(S1), P(S2), P(S3), . . . , P(Sn) 1408 can be integrated, in whole or part, into that equipment.

The processor(s) 1410 implement the functions described herein, either separately or in conjunction with the CPU(s) and hardware of the vehicle that would otherwise handle display of the instruments in the graphical display of the instrument panel in the conventional manner. As shown in FIG. 14, the processor(s) 1410 operate under software control to implement the conventional vehicle instrument display functions as well as handle instrument widget prioritization and layout handling according to one or more of the variants described herein and cause them to be displayed on the instrument panel display 200 (and optionally an appropriate secondary display 1102, if available).

More particularly, the processor(s) 1410, receive information and/or data from the sensors and, based upon the information and/or data from two or more of the sensors, determine whether conditions then exist that may lead to a fault or that the driver should be made aware of such that they can monitor the situation before a fault exists, modify their driving to avoid a possible future fault, or be aware of conditions (that they might otherwise be unaware of) that may adversely affect the vehicle or its operation.

The processing system further includes storage 1412, which is comprised of, for example, RAM, ROM, non-volatile program and data storage, etc. Specifically, the storage 1412 includes non-volatile storage where instrument-implementing widget-related data 1414 is stored and may also include non-transitory storage of at least the importance values for those instrument-implementing widgets. Alternatively, the widget importance values may be stored in RAM in a non-transitory manner, meaning that the importance values are present for at least as long as the vehicle is running and/or power is provided to that part of the storage.

Programming within the program storage causes the processor(s) 1410 to analyze data from the various sensor(s) 1404, 502 and make determinations based upon combinations of that data that a circumstance warrants changing the importance of one or more widgets and which may result in modification of the presence, location and/or size of the widgets contained within the instrument panel display 200, for example, a combination of sensors that determine that the vehicle is going uphill, under high engine revolutions in low gear under hot temperature conditions to preemptively indicate that possible overheating could result, as described above.

Figure 15:
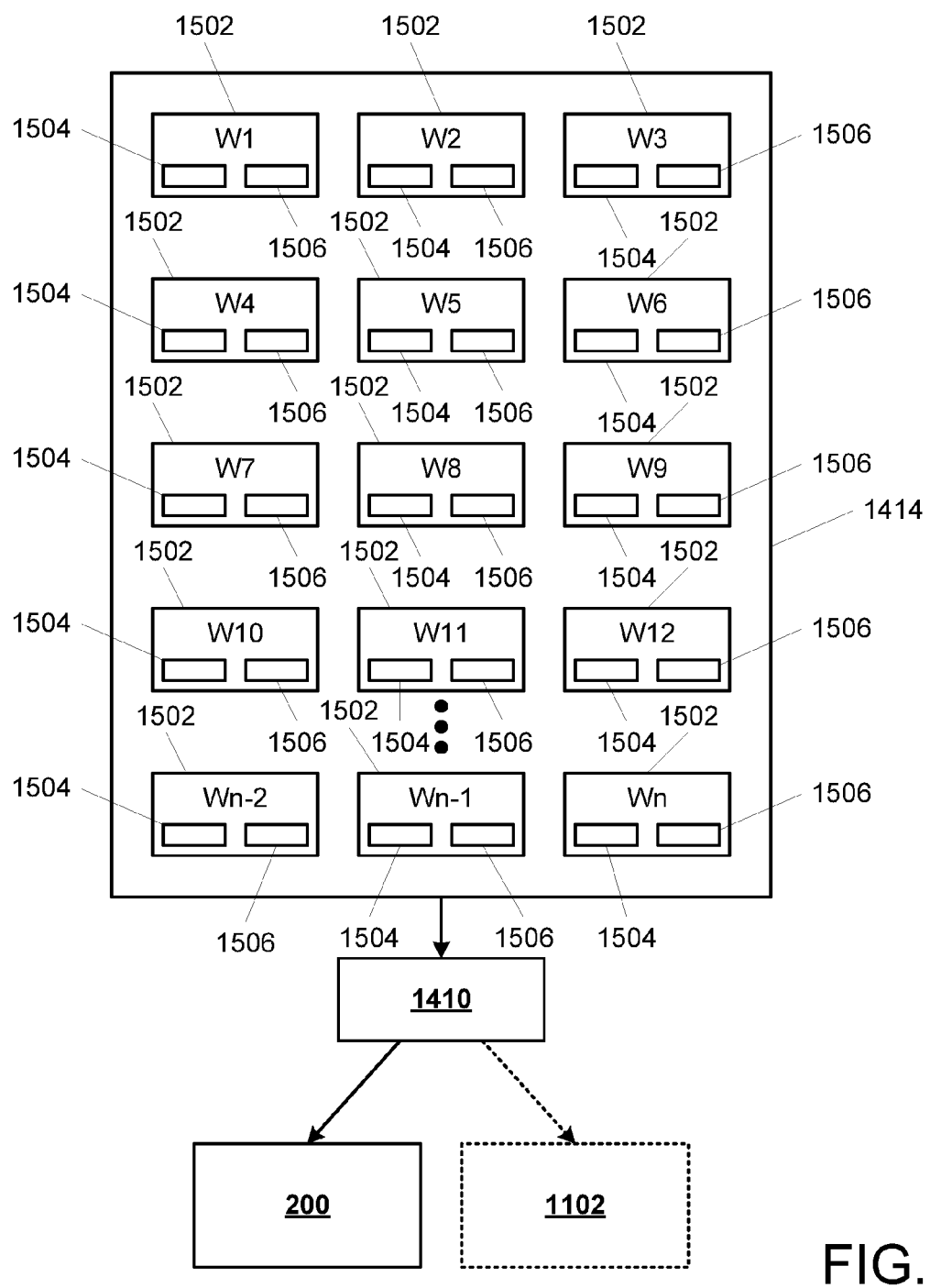
FIG. 15 illustrates, in simplified form, an enlarged portion of the system of FIG. 14.

FIG. 15 illustrates, in simplified form, an enlarged portion of the system of FIG. 14.

As shown in FIG. 15, the widget-related data 1414 is made up of widget specific information 1502 for each widget W1, W2, W3, . . . , W11, W12, . . . , Wn−2, Wn−1, Wn, for example, the program code for implementing each widget, alternative shaped/sized versions of the same widget and/or scaling limits for that widget. In addition, the widget specific information 1502 for each widget W1, W2, W3, . . . , W11, W12, . . . , Wn−2, Wn−1, Wn will also include an importance value 1504 and, if and when appropriate or desired, one or more prior or default importance values 1506, that can be used in some circumstance(s), for example, to revert back to an immediately preceding importance value and/or impose a particular configuration through use of an established set of importance values for particular widgets as described herein.

The widget specific information 1502 and importance values 1504 (and optional other importance values 1506) are accessible to the processor(s) 1410 and, in the case of at least the importance values 1504, can be modified by the processor(s) 1410 to effect the changes in locations as described herein.

In addition, some variants of the widget-related data 1414 can include mapping of importance values and locations within the instrument panel display 200 to establish where a particular importance value should cause a widget to appear in the instrument panel display 200 without regard to any other widget. Other variants can use other straightforward approaches to establish a relationship between importance value and instrument panel display location.

Finally, it is to be noted that "importance value" is to be understood to be a relative term that is used to establish some relationship among the various widgets and should not be interpreted as requiring any particular scheme. For example, in one example implementation, an importance value of "7" for a widget might indicate greater importance than an importance value of "9" for a different widget, whereas, for an alternative example implementation, the reverse could be true. Likewise, the importance value does not require use of numbers, only some scheme whereby one value can be recognized as greater than another. For example, an arbitrary scheme in which an importance value of a character "&" renders one widget more important than another widget with an importance value of "Rq" or vice versa is equally acceptable, the key being establishing the importance relationship among the widgets that can be displayed in the instrument panel display, not the particular character(s)/numbers used to do so.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. An adaptive, automatically-reconfigurable, vehicle instrument display method performed within a vehicle having multiple sensors located within the vehicle that monitor various aspects of a vehicle's operation and health, the method comprising:
    displaying in an instrument panel display of the vehicle, using at least one processor, at least some of multiple widgets representing at least some analog gauges, the displayed widgets each being positioned within the instrument panel display, wherein each displayed widget has associated therewith an importance value establishing its position within the instrument panel display;
    receiving, using the at least one processor coupled to the sensors, first information from the sensors, while the vehicle is being driven by a driver, to be analyzed by the at least one processor;
    determining, using the at least one processor, that the first information reflects a change representing
        a) a vehicle-related non-failure condition, or
        b) an increased gripping force applied by the driver to the steering wheel in excess of a threshold for a specified period of time while the vehicle is being driven, and that change necessitates modifying at least one importance value for at least one of the multiple widgets;
    using the processor, modifying the importance value of at least a first of the multiple widgets to a new importance value based upon a result of the determining;
    storing the importance value as an other importance value in storage linked to the first of the multiple widgets, and
    using the processor, automatically, dynamically, modifying at least a position of the first widget to a specific position in the instrument panel display to reflect the change, based upon the new importance value and irrespective of any previously established widget positioning, without any action by the driver of the vehicle.

2. The adaptive, automatically-reconfigurable, vehicle instrument display method of claim 1, where in the automatically, dynamically, modifying further comprises:
    using the at least one processor, automatically removing a second of the multiple widgets from the instrument panel display to provide room for display of the first widget.

3. The adaptive, automatically-reconfigurable, vehicle instrument display method of claim 1, further comprising:
    modifying the importance value of one of the multiple widgets that is not displayed in the instrument panel display, at a time immediately prior to the change, from an initial value to a heightened importance value reflecting the change; and
    based upon the heightened importance value, inserting the one of the multiple widgets into the instrument panel display.

4. The adaptive, automatically-reconfigurable, vehicle instrument display method of claim 3, wherein, in connection with the inserting using the at least one processor, the method further comprises:
    automatically replacing one widget displayed within the instrument panel display with a different version of the one widget.

5. The adaptive, automatically-reconfigurable, vehicle instrument display method of claim 3, wherein, in connection with the inserting using the at least one processor, the method further comprises:
    automatically re-sizing an other of the multiple widgets displayed within the instrument panel display.

6. The adaptive, automatically-reconfigurable, vehicle instrument display method of claim 3, wherein, in connection with the inserting using the at least one processor, the method further comprises:
    automatically moving a second of the multiple widgets from one location within the instrument panel display to an other location within the instrument panel display.

7. The adaptive, automatically-reconfigurable, vehicle instrument display method of claim 3, wherein, in connection with the inserting using the at least one processor, the method further comprises:
    automatically removing a second of the multiple widgets from the instrument panel display.

8. The adaptive, automatically-reconfigurable, vehicle instrument display method of claim 1, further comprising:
    receiving, using the at least one processor coupled to the sensors, second information from the sensors to be analyzed;
    determining, using the at least one processor, that the second information reflects a new change back to a normal condition; and
    based upon the new change back to the normal condition, automatically modifying widget importance values to default values reflective of the normal condition; and modifying the instrument panel display, based upon the default values, such that it contains widgets specified and positioned to reflect the normal conditions.

9. An adaptive, automatically-reconfigurable, vehicle instrument display system for a vehicle driven by a driver, the system comprising:
  I) at least one processor within the vehicle;
  II) multiple sensors, within the vehicle and coupled to the at least one processor, that sense conditions related to
    a) aspects of a vehicle's operation and health,
    b) a change in driver gripping force applied to the vehicle's steering wheel,
    c) an obstruction between the driver's eyes and an instrument panel display in the vehicle that displays, under processor control, multiple widgets, the multiple widgets being digital counterparts to analog in-dashboard vehicle gauges,
  and outputs data reflective of the sensed conditions;
  III) wherein, each of the multiple widgets have associated locations in non-volatile storage defined to store, for each individual widget, at least one associated current importance value and at least one other importance value;
  IV) wherein the at least one processor is programmed to, while the vehicle is being operated
    a) display at least some widgets in the instrument panel display,
    b) receive the data reflective of the sensed conditions,
    c) determine whether the data necessitates a change in any widget importance values, and
    d) if the data necessitates changing any widget importance values, change all appropriate importance values in the current importance value locations from existing importance values to new importance values and automatically modify presence, location, or both, of any widgets, such that the instrument panel display will then contain widgets in locations reflective of the new importance values, irrespective of the existing importance values, user-specified widget placement in the instrument panel display, or pre-set widget placement in the instrument panel display.

10. The adaptive, automatically-reconfigurable, vehicle instrument display system of claim 9, wherein the multiple sensors comprise at least some of:
  an engine speed sensor, a sensor for coolant level, a coolant temperature sensor, an oil temperature sensor, an oil level sensor, a throttle position sensor, an ammeter, a voltmeter, a vehicle speed sensor, a tire inflation pressure sensor, a wheel slip sensor, a steering angle sensor, a steering torque sensor, a suspension travel sensor, a fuel tank content level sensor, a traction control sensor, a thermometer, a microphone, a multi-axis sensor, an accelerometer, a gas sensor, at least one sensor within the instrument panel directed at the driver to identify distance to an object within the vehicle, at least one sensor within the instrument panel directed at the driver for pupil tracking, a capacitive sensor in the vehicle's steering wheel, or an inductive sensor in the vehicle's steering wheel.

* * * * *

UNITED STATES PATENT AND TRADEMARK OFFICE
CERTIFICATE OF CORRECTION

PATENT NO. : 9,637,002 B1
APPLICATION NO. : 15/169909
DATED : May 2, 2017
INVENTOR(S) : Gregory J. Boss et al.

Page 1 of 1

It is certified that error appears in the above-identified patent and that said Letters Patent is hereby corrected as shown below:

On the Title Page

Item (63), delete:
", and a continuation of application No. 14/944.061, filed on Nov. 17, 2015, now Pat. No. 9,452,678, and a continuation of application No. 14/944,080, filed on Nov. 17, 2015, now Pat. No. 9,469,195"

Signed and Sealed this
Twenty-seventh Day of August, 2019

Andrei Iancu
*Director of the United States Patent and Trademark Office*